US012807187B2

(12) United States Patent
Cheng et al.

(10) Patent No.: US 12,807,187 B2
(45) Date of Patent: Nov. 24, 2026

(54) AUTONOMOUS DRIVING SYSTEM WITH PRIORITIZING ENERGY-SAVING CONSIDERATIONS

(71) Applicant: The Hong Kong Polytechnic University, Hung Hom (HK)

(72) Inventors: Ka Wai Eric Cheng, Hung Hom (HK); Jinhong Sun, Hung Hom (HK); Hebing Liu, Hung Hom (HK); Heshou Wang, Hung Hom (HK)

(73) Assignee: The Hong Kong Polytechnic University, Hung Hom (HK)

( * ) Notice: Subject to any disclaimer, the term of this patent is extended or adjusted under 35 U.S.C. 154(b) by 46 days.

(21) Appl. No.: 18/658,780

(22) Filed: May 8, 2024

(65) Prior Publication Data

US 2025/0206349 A1 Jun. 26, 2025

Related U.S. Application Data

(60) Provisional application No. 63/613,538, filed on Dec. 21, 2023.

(51) Int. Cl.
*B60W 60/00* (2020.01)
*B60W 20/11* (2016.01)
(Continued)

(52) U.S. Cl.
CPC ........ *B60W 60/0023* (2020.02); *B60W 20/11* (2016.01); *B60W 30/182* (2013.01);
(Continued)

(58) Field of Classification Search
CPC ............. B60W 60/0023; B60W 20/11; B60W 30/182; B60W 50/0098;
(Continued)

(56) References Cited

U.S. PATENT DOCUMENTS 10,035,515 B2 7/2018 List et al. ............. B60W 40/12
10,196,086 B2 2/2019 Gupta et al. ........... B62D 6/005
(Continued)

OTHER PUBLICATIONS

Winn et al., Optimization of Human Generated Trajectories for Safety Controller Synthesis, Jun. 17-19, 2013, 2013 American Control Conference (ACC), pp. 4374-4379 (Year: 2013).*
(Continued)

*Primary Examiner* — Sze-Hon Kong
(74) *Attorney, Agent, or Firm* — Stein IP, LLC

(57) ABSTRACT

An autonomous driving system having a three-layer framework to optimize energy consumption in autonomous driving by utilizing the driving trajectory of human drivers. The first layer involves smoothing out the driving path to reduce its curvature, thereby avoiding sudden changes in acceleration and velocity caused by abrupt path changes. The second layer is a trajectory optimization stage, where a relationship between speed and time in the human driving trajectory is assigned to the smoothed path. The acceleration is calculated at each moment based on the motor torque-rotational speed efficiency diagram and the corresponding output efficiency of the motor. A best efficiency interval is then determined based on a reference motor efficiency, which is then converted into an optimal speed and acceleration interval of each of the wheels. On the smooth path, the optimal speed and acceleration interval are jointly optimized to obtain the best driving trajectory in order to ensure that the motor operates in the high-efficiency interval. In the third layer, the generated optimal trajectory is combined with the model predictive control (MPC) method to generate the optimal steering angle to achieve accurate trajectory tracking.

10 Claims, 20 Drawing Sheets

(51) Int. Cl.
*B60W 30/182* (2020.01)
*B60W 50/00* (2006.01)

(52) U.S. Cl.
CPC . *B60W 50/0098* (2013.01); *B60W 2050/0052* (2013.01); *B60W 2520/28* (2013.01)

(58) Field of Classification Search
CPC ..... B60W 2050/0052; B60W 2520/28; B60W 30/045; B60W 30/18145
See application file for complete search history.

(56) References Cited

U.S. PATENT DOCUMENTS

| | | | | |
|---|---|---|---|---|
| 10,656,644 | B2 * | 5/2020 | Lin | B60W 40/09 |
| 12,280,796 | B1 * | 4/2025 | Schleede | B60W 60/0011 |
| 2015/0284010 | A1 * | 10/2015 | Beardsley | B60W 30/08 701/1 |
| 2017/0088174 | A1 * | 3/2017 | Inoue | B62D 6/003 |
| 2018/0373268 | A1 | 12/2018 | Antunes Marques Esteves | G05D 1/0291 |
| 2020/0031371 | A1 * | 1/2020 | Soliman | B60W 10/04 |
| 2022/0371574 | A1 * | 11/2022 | Chevalier | B60W 60/0023 |
| 2023/0068356 | A1 * | 3/2023 | Aggoune | G01C 21/3492 |
| 2024/0262422 | A1 * | 8/2024 | Garimella | B62D 21/07 |
| 2025/0074416 | A1 * | 3/2025 | Olin | B60L 58/10 |
| 2025/0083741 | A1 * | 3/2025 | Yang | B60L 15/20 |
| 2025/0171046 | A1 * | 5/2025 | Linscott | G06N 20/00 |
| 2025/0196844 | A1 * | 6/2025 | Kaneko | B60W 30/02 |
| 2025/0268443 | A1 * | 8/2025 | Knutson | A47L 11/4044 |

OTHER PUBLICATIONS

Liu et al., A Two-Layer Model Predictive Path-Tracking Control With Curvature Adaptive Method for High-Speed Autonomous Driving, Aug. 17, 2023, IEEE Access, pp. 89228-89239 (Year: 2023).*

He et al., A Two-Layer Controller for Lateral Path Tracking Control of Autonomous Vehicles, Jul. 1, 2020, MDPI, Sensors 2020, pp. 1-20 (Year: 2020).*

Y. Zhang, Z. Ai, J. Chen, T. You, C. Du and L. Deng, "Energy-Saving Optimization and Control of Autonomous Electric Vehicles With Considering Multiconstraints," *IEEE Transactions on Cybernetics*, vol. 52, No. 10, pp. 10869-10881, Oct. 2022.

A. Desreveaux, A. Bouscayrol, R. Trigui, E. Castex and J. Klein, "Impact of the Velocity Profile on Energy Consumption of Electric Vehicles," IEEE Transactions on Vehicular Technology, vol. 68, No. 12, pp. 11420-11426, Dec. 2019.

J. Hu, Z. Li, P. Zhu and F. Xiao, "Speed Trajectory Optimization Method for Electric Vehicles Based on Driving Style," IEEE Transactions on Transportation Electrification, vol. 9, No. 1, pp. 1541-1553, Mar. 2023.

K. Shen, X. Ke, F. Yang, W. Wang, C. Zhang and C. Yuan, "Numerical Energy Analysis of In-Wheel Motor Driven Autonomous Electric Vehicles," IEEE Transactions on Transportation Electrification, vol. 9, No. 3, pp. 3662-3676, Sep. 2023.

Y. Zhang, T. You, J. Chen, C. Du, Z. Ai and X. Qu, "Safe and Energy-Saving Vehicle-Following Driving Decision-Making Framework of Autonomous Vehicles," IEEE Transactions on Industrial Electronics, vol. 69, No. 12, pp. 13859-13871, Dec. 2022.

* cited by examiner

13522

(a) Conventional Front-Wheel Steering (b) Front-Rear Wheel Opposite Direction Steering (c) Front-Rear Wheel Same Direction Steering (a) Differential Speed Steering with Two Different Speeds on Front Wheels.

(b) Differential Speed Steering with a Speed on Front Left-Wheel and No Speed on Front Right-Wheel.

(c) Differential Speed Steering with Opposite Direction Speeds on the Front Wheels.

AUTONOMOUS DRIVING SYSTEM WITH PRIORITIZING ENERGY-SAVING CONSIDERATIONS

CROSS-REFERENCE TO RELATED APPLICATIONS

This application claims the benefit of U.S. Provisional Application No. 63/613,538, filed Dec. 21, 2023 in the U.S. Patent and Trademark Office. All disclosures of the document named above are incorporated herein by reference.

BACKGROUND OF THE INVENTION

1. Field of the Invention

Aspects of the invention relate to self-driving (autonomous) electric vehicles (e.g., automobiles) with energy efficiency as a priority and which enhance the execution function of differential steering control.

2. Description of the Related Art

A manual or driver assistive control vehicle has been developed for years but is gradually being replaced by autonomous vehicles (Avs). Self-driving vehicles collect and record data or real-time data and an algorithm analyzes and provides a trajectory and speed that governs routing of the vehicle. Minimizing the energy consumption of AVs is important for global concern in carbon neutrality. Implementing energy-saving control techniques, such as motor energy efficiency map analysis and constraint optimization, can significantly reduce the energy consumption of AVs, rather than only focusing too much on driverless algorithms. A control method leads to substantial operational cost and energy savings and promotes green technology.

SUMMARY OF THE INVENTION

Aspects of the present invention relate to an autonomous driving system and a method that Implements energy-saving control techniques, such as motor energy efficiency map analysis and constraint optimization, and can significantly reduce the energy consumption of AVs, rather than only focusing too much on driverless algorithms. Such a control method leads to substantial operational cost and energy savings/efficient energy usage, and promotes green technology.

Aspects of the present invention relate to a new green demand method that optimizes energy processing in autonomous driving by utilizing special human driving trajectories. The proposed framework includes three layers, a path smoothing layer, a speed trajectory layer and a path tracking layer. The path smoothing (first) layer is responsible for smoothing the human driving path, reducing its curvature, and preventing sudden acceleration changes. In the speed trajectory optimization (second) layer, a speed-time relationship of the human driving trajectory is assigned to the smoothed path, and acceleration is calculated at each moment. A motor's output efficiency requirement is achieved and based on a motor efficiency map. The best efficiency interval is determined in the motor efficiency map based on the reference motor efficiency, and the best speed and acceleration interval is obtained. The path tracking (third) layer combines the optimal trajectory with a model predictive control (MPC) controller to generate an optimal steering angle to achieve accurate trajectory tracking. Optimizing the best speed and acceleration interval, the autonomous driving trajectory with the optimal energy-saving constraints is obtained.

A differential gear or Ackerman steering is a steering system that has been used in previous and present autonomous vehicles but their actuation is slow and not safe. A vehicle-based differential speed steering provides greater maneuverability. This advanced system allows for independent speed and rotational angle control of each wheel, and results in differential wheel rotation and angle control during turning. This feature enables the vehicle to execute sharper turns within a reduced turning radius and allows for an accurate determination of the turning radius and center, thereby improving navigational ease across diverse driving conditions. The vehicle's ability to modulate wheel speeds and rotational angles based on the desired turning angle facilitates navigation through confined spaces and complex roadways. The reduced turning circle significantly improves the vehicle's performance in narrow lanes and sharp cornering and enables efficient execution of sharp turns, 90-degree turns, U-turns, lane change, and precise parking maneuvers. Differential speed steering provides the vehicle with enhanced control over its trajectory dynamically and leads to increased efficiency, reduced maneuver time and safety during turns. Furthermore, this innovative steering control solution in AVs promises heightened versatility and optimized performance across a wide variety of driving scenarios. In the broader context of autonomous vehicle technology, differential speed steering represents a significant application and technology advancement. It not only improves the immediate maneuverability and safety of the vehicle in rapid control but also contributes to the overall goal of energy-efficient autonomous transportation systems. This technology is a future steering technology and can revolutionize the way that AVs interact with their environment, and pave the way for advanced vehicle development.

Compared to most autonomous driving systems, aspects of the present invention have several advantages, including: (1) path data is derived from real human driving cases and thoroughly analyzed to consider human behavior as a constraint during path smoothing. This ensures that the optimal driving path guarantees safety and comfort; (2) the energy consumption of each scene in the human driving trajectory is analyzed in detail, optimizing trajectory curvature and speed for energy-consuming scenes. The resulting trajectory is then further optimized to prioritize energy savings; (3) a motor energy efficiency map analysis maps constraints of vehicle speed and acceleration to motor torque, ensuring that motor operates in the high-energy efficiency range throughout the automatic driving process to achieve even more energy savings; (4) a detailed numerical analysis is conducted comparing human driving to the control methods presented in the present application for common driving scenarios. The analysis includes path, speed, acceleration, and energy consumption results; (5) a new differential speed steering control method is used in an actuation module, which lets the vehicle easily turn more sharply and easily navigate narrow and curved roads.

According to an aspect of the present invention, an autonomous driving system for a vehicle having wheels, comprises: an electric vehicle body with a wire-controlled skateboard chassis;

an energy-saving control unit comprising:

- a data acquisition and processing module to collect driving data of a human and environment information;

a constraints generation module which determines a suggested speed and acceleration region based on the driving data of the human and vehicle model constraints;

a joint optimization module transforms path information of the human into an optimization problem; and an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel;

wherein the path tracking module determines a turning radius for the vehicle, and the differential steering controller uses the turning radius to adjust speeds of the wheels.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
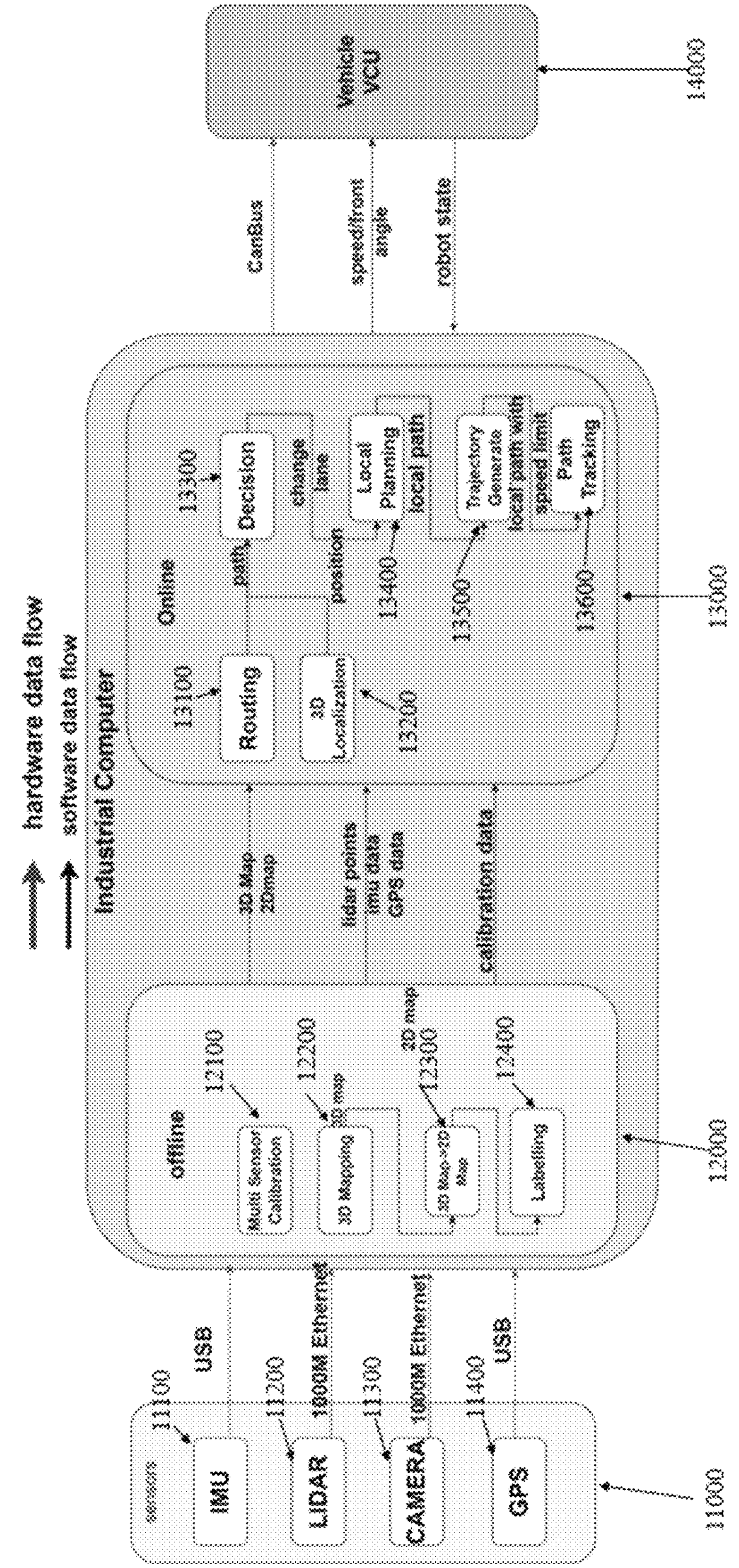
FIG. 1 shows an entire autonomous driving system of an electric vehicle (EV).

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to an autonomous driving system having a three-layer framework to optimize energy consumption in autonomous driving by utilizing the driving trajectory of human drivers. The first layer involves smoothing out the driving path to reduce its curvature, thereby avoiding sudden changes in acceleration and velocity caused by abrupt path changes. The second layer is a trajectory optimization stage, where a relationship between speed and time in the human driving trajectory is assigned to the smoothed path. The acceleration is calculated at each moment based on the motor torque-rotational speed efficiency diagram and the corresponding output efficiency of the motor. A best efficiency interval is then determined based on a reference motor efficiency, which is then converted into an optimal speed and acceleration interval of each of the wheels. On the smooth path, the optimal speed and acceleration interval are jointly optimized to obtain the best driving trajectory in order to ensure that the motor operates in the high-efficiency interval. In the third layer, the generated optimal trajectory is combined with the model predictive control (MPC) method to generate the optimal steering angle to achieve accurate trajectory tracking.

FIG. 1 shows a complete framework of an autonomous driving system of a vehicle, according to an aspect of the present invention, that is designed for self-navigation through processes of perception, control, navigation, and execution. The perception capability is the system's ability to interpret its environment and detect potential obstacles, traffic signs, lanes, and other pertinent information. This is achieved through the use of various sensors 11000 embedded in the hardware component of the system. The sensors employed in this system encompass a number of units. They include Inertial Measurement Unit (IMU) 11100, Light Detection and Ranging (LIDAR) sensor 11200, cameras 11300, and a Global Positioning System (GPS) 11400. The IMU 11100 and GPS 11400 are primarily responsible for providing real-time vehicle positional data. The LiDAR sensor 11200 primarily detects surrounding obstacles and aids the IMU 11100 and GPS 11400 in providing high-precision positioning at the centimeter level. The cameras 11300 are mainly utilized for detecting surrounding obstacles using visible images to ensure safety during the vehicle's operation.

Control and navigation are facilitated by advanced artificial intelligence algorithms, primarily executed through an industrial computer (which includes a processor). The industrial computer can be regarded, for example, as the brain of the vehicle in the autonomous driving system, which is responsible for processing large amounts of sensor data, executing complex algorithms and controlling various functions of the vehicle. The industrial computer includes an offline module 12000 and an online (control navigation) module 13000. Multi-Sensor Calibration 12100 technology is a sophisticated approach that amalgamates perceptual data from an array of sensors to garner more reliable, accurate, and precise information (driving data) which may be saved in a binary file format in a storage medium for efficient storage and transmission. the binary data is converted into a readable and structured format of a .txt file, and this file is stored in the industrial computer).

This technology is critical in ensuring the robustness and reliability of the autonomous driving system. 3D mapping 12200, a fundamental component of autonomous driving, uses high-precision maps to aid in accurate path planning. Given the need for extreme positioning accuracy (10 cm), the 3D mapping works in conjunction with the IMU 11100 and GPS 11400 hardware. Using a 3D Map->2D Map 12300, a 3D point cloud map is converted into a 2D raster map for route planning. The 2D map is further edited by a labelling module 12400 to include roads, obstacles, and traffic elements. The labeling module 12400 involves annotating the 3D map to extract information and generate HD maps. These maps detail roads, lane lines, guardrails, traffic signs, and dynamic information. They are integral to the vehicle's positioning, planning, decision-making, and control, forming the foundation of automated driving solutions.

Upon receiving a destination, a routing module 13100 process uses high-precision map data and the vehicle's current position to generate an optimal global path for guiding local path planning. A 3D localization module 13200 processes real-time sensor data to provide the vehicle's position and attitude angle. This high-precision positioning, accurate to the centimeter and 1% radian, is crucial for the safe operation of the vehicle. A decision layer 13300, upon receiving the global path, makes behavior decisions like lane changing and stopping. The behavior decisions are based on environmental data from the various sensors (perception module) 11000 and the vehicle's current status. local planning module 13400 designs safe trajectories for vehicles, considering various constraints.

These planned paths are then used by a trajectory generation (control) module to guide the vehicle. A trajectory (constraints) generation module 13500 aims to assign speed and acceleration to path points on a local curve, considering feedback control constraints and behavior decisions. The trajectory generation module 13500 primarily focuses on avoiding dynamic obstacles. A path tracking (navigation control) module 13600 allows a vehicle to follow a set path at a specific speed, with acceptable error margins, regardless of time. Moreover, a vehicle chassis 14000 is also considered the actuation layer, and constitutes the final stage in the hierarchical structure of an autonomous vehicle's control system. This layer is fundamentally the vehicle's bottom executive mechanism, where all processed data converge to coordinate the vehicle's behavior/actions.

A function of the main function module, which may be incorporated in the industrial computer, may be implemented by at least one of electronic units such as an application-specific integrated circuit (ASIC), a digital signal processor (DSP), a programmable logic device (PLD), a field programmable gate array (FPGA), a processor, a controller, a microcontroller, and/or a microprocessor, or may be implemented by a software module that performs at least one function or operation. The software module may be implemented by using a software program compiled by using any appropriate software language. The software program may be stored in a memory in a mobile device or a network, and is read and executed by a processor.

By way of example and instead of limitation, some computer readable storage media may include a RAM, a ROM, an EEPROM, a CD-ROM, another optical disc storage or magnetic disk storage, another magnetic storage apparatus, a flash memory, or any other medium that can store required program code in a form of an instruction or a data structure and can be accessed by a computer.

In addition, functional units in the embodiments of the present invention may be integrated into one processing unit, or each of the units may exist alone physically, or two or more units are integrated into one unit.

The processor 2011 may be a general-purpose central processing unit (CPU), a microprocessor, an application-specific integrated circuit (ASIC), or one or more integrated circuits configured to control program execution in the solutions of this application.

Figure 2:
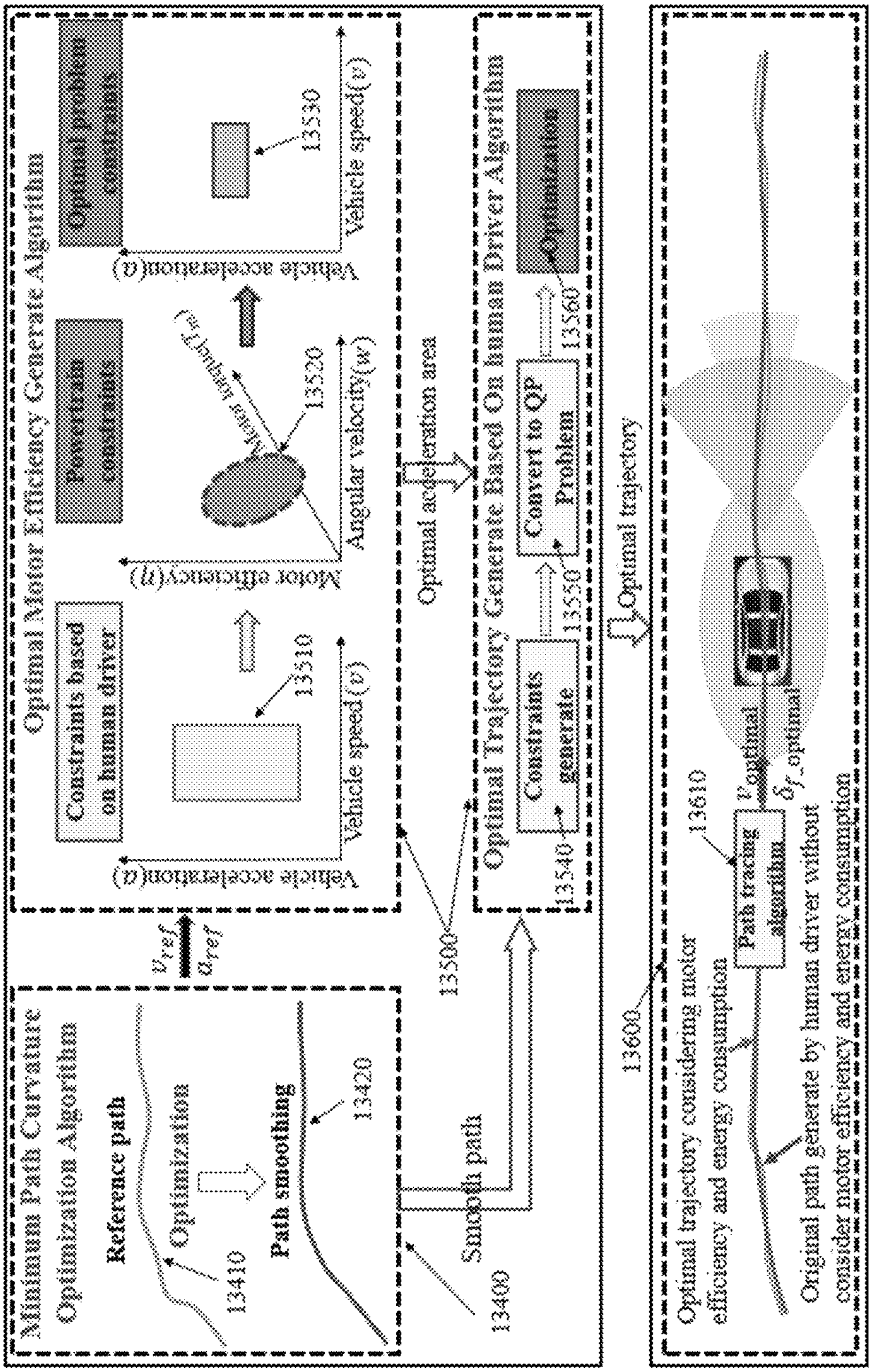
FIG. 2 shows a framework of human-like style autonomous driving.

FIG. 2 reveals complex algorithms employed in the local planning module 13400, the trajectory generation module 13500, and the path tracking module 13600 components. All of the modules are executed within the industrial computer. Aspects of the present invention are primarily, although not exclusively, encapsulated in three key areas: the generation of an optimal path, the generation of optimal motor output efficiency, and the accurate path-tracking method. When they are linked, these elements significantly enhance the autonomous driving system's overall efficiency and effectiveness. The local planning module 13400 includes a comprehensive methodology for generating a local reference path 13410, an extensive list of variables, and an optimization method utilized in path smoothing optimization 13420. A systematic process for generating optimal output efficiency points of motors is namely as the trajectory generation module 13500 which is dedicated to optimal motor efficiency generation and includes algorithms 13510, 13520, and 13530. The trajectory generation module 13500 also houses optimal trajectory generation algorithms 13540, 13550, and 13560, and is a robust mechanism for accurate path tracking. The path tracking module 13600 is responsible for the accurate path-tracking algorithm 13610. This detailed breakdown of the system's components and their respective algorithms provides a thorough understanding of the autonomous driving system's operation, highlighting its innovative aspects and efficiency, according to an aspect of the present invention.

Figure 3:
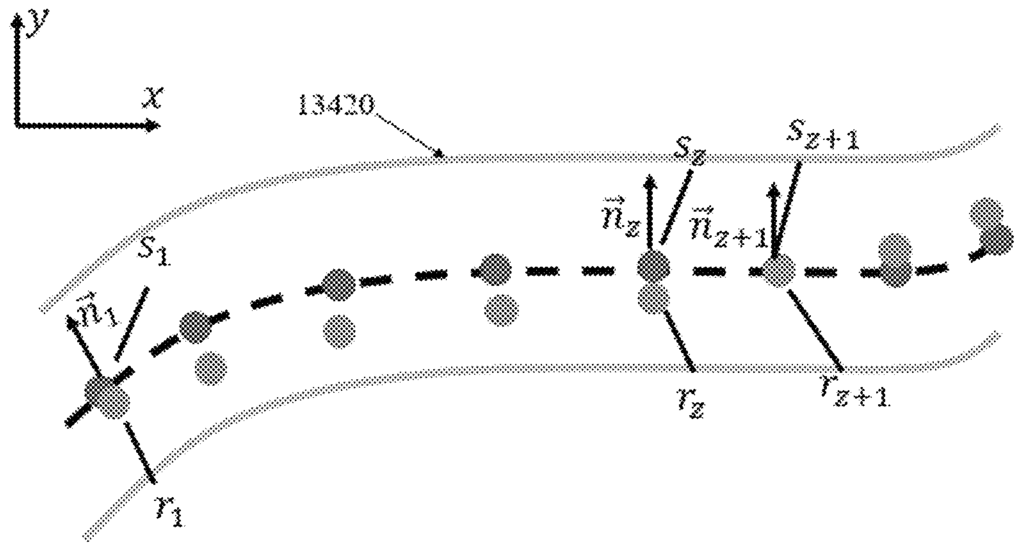
FIG. 3 shows a path smoothing optimization for a human driving path.

FIG. 3 shows a path smoothing optimization 13420 that uses the human-driven trajectories as limits to make a smooth path with low curvature. The path smoothing optimization 13420 makes the automatic driving path more accurate and efficient than the human driving methods. The path taken by a human driver can be discretized into N-1 segments, and points on that path are represented by $\vec{t}_z=[x_z\ y_z]^T,(z=1,2, \ldots, N)$. After applying optimized control, the optimized smoothing points are $\vec{s}_z,(z=1,2, \ldots, N)$.

Figure 4:
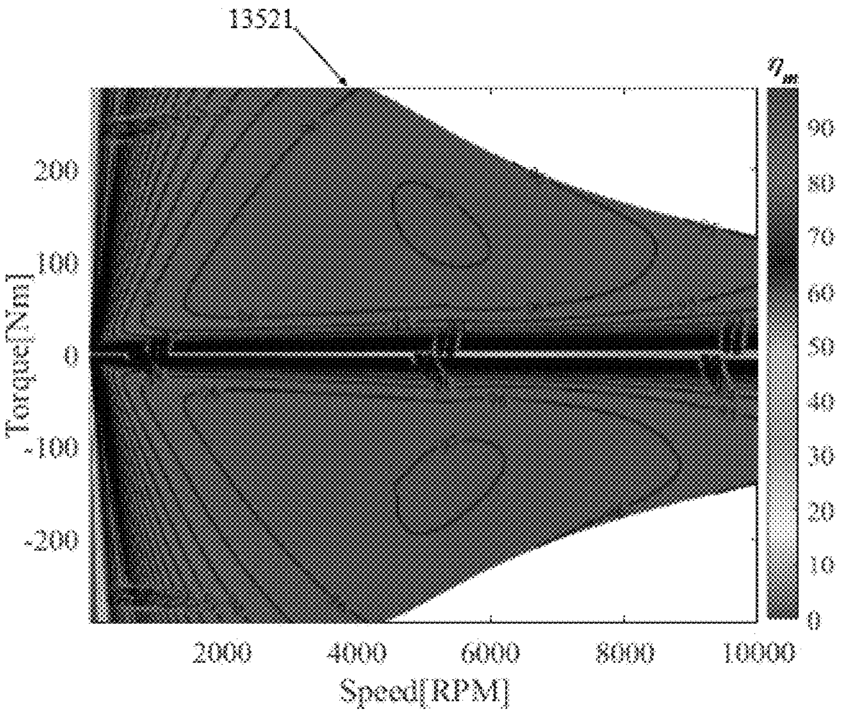
FIG. 4 shows an efficiency map of an internal permanent magnet (IPM) motor.

A successful implementation of submodule 13520 necessitates the utilization of a motor energy efficiency map 13521, as shown in FIG. 4. The motor energy efficiency map serves as a resource, providing valuable insights into the energy efficiency of the motor under various operating conditions.

Figure 5:
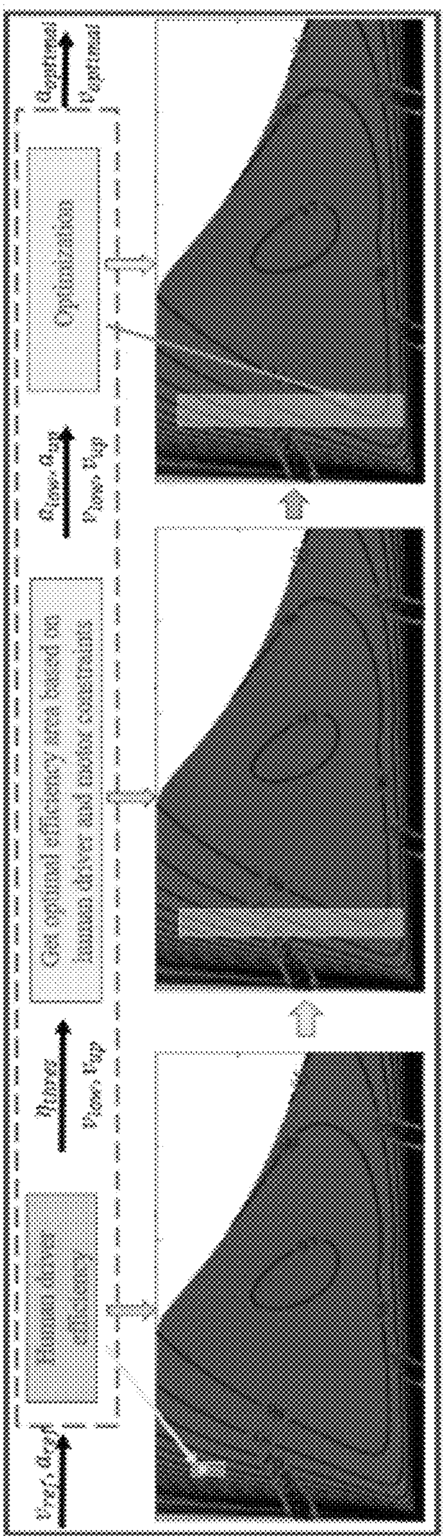
FIG. 5 shows a mapping constraints relation between the EV and a powertrain.

Primary control parameters of the submodule 13520 can be conceptualized as a mapping constraints relationship 13522 between the vehicle and a powertrain, as visually represented in FIG. 5, providing a clear and concise overview of the interdependencies between the vehicle and its powertrain. Efficiency point identification, a motor output efficiency point of a current path is found in a suggested area, which is shown by the shaded part of the second (middle) image in FIG. 5. The suggested area is where a motor output efficiency map that corresponds to a desired speed and torque range of the vehicle, the motor output efficiency point on the map has a highest efficiency value for the current trajectory.

Figure 6:
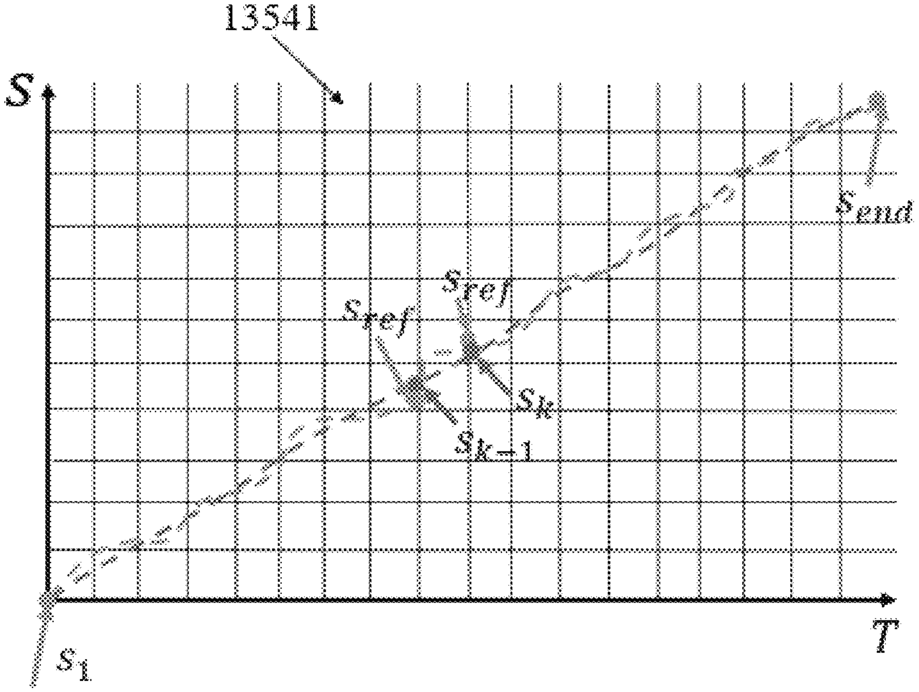
FIG. 6 shows a speed-time (ST) graph.

A speed-time (ST) graph 13541, illustrated in FIG. 6, offers a visual representation of the vehicle's velocity as a function of time. This graphical representation is particularly beneficial for the control of autonomous driving, providing a clear and immediate understanding of the vehicle's speed dynamics over time.

Figure 7:
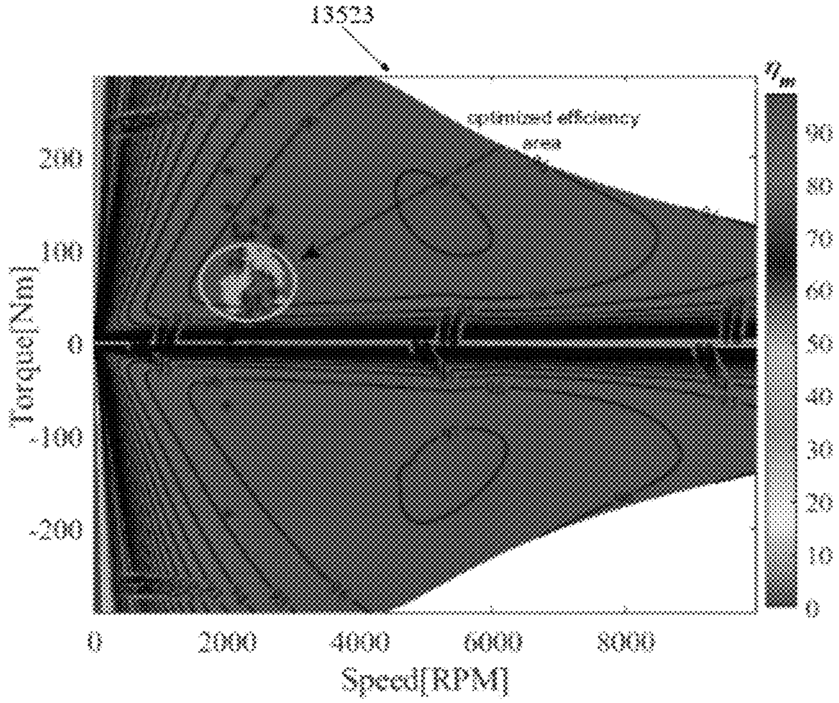
FIG. 7 shows an efficiency map result of a left turn case.

Finally, the culmination of this process is the presentation of the final energy efficiency optimization results 13523, which are illustrated in FIG. 7. These results provide a comprehensive overview of the energy efficiency achieved through the implementation of the aforementioned processes and methodologies.

Figure 8:
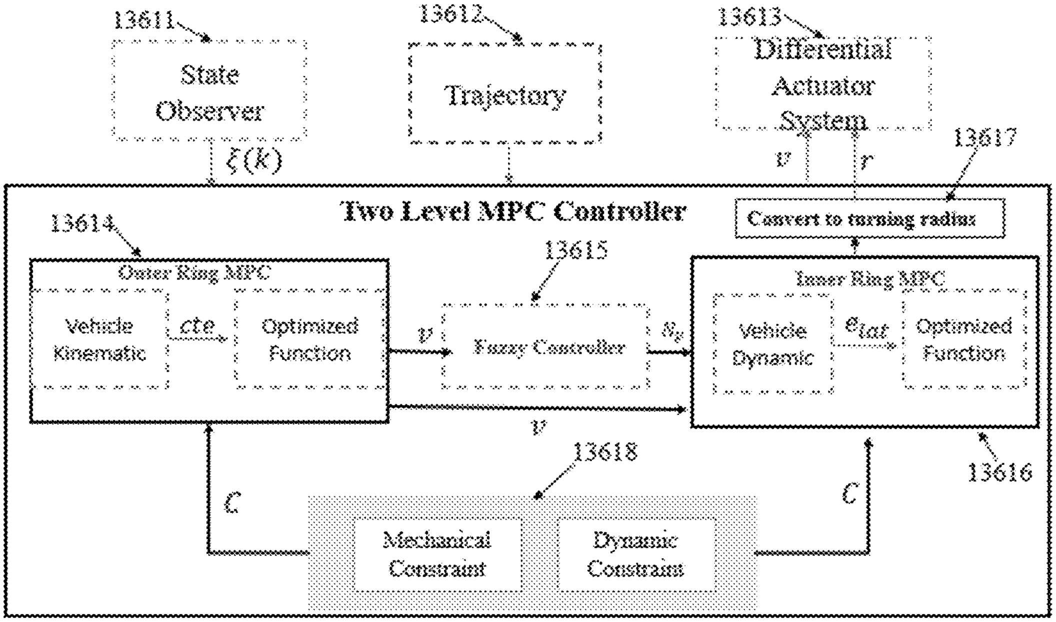
FIG. 8 shows a path-tracking algorithm for human-like style autonomous driving.

FIG. 8 shows a two level MPC algorithm, which is the details of the path-tracking algorithm 13610 mentioned in FIG. 2. The upper-level MPC 13614 enhances safety by minimizing path curvature and avoiding obstacles. The outer MPC predicts trajectories using vehicle kinematics. The driving speed decelerates before curves to reduce tracking errors from high-speed inaccurate modeling and accelerates after corners for efficiency. An acceleration change constraint limits speed changes to prevent energy loss from rapid acceleration or deceleration.

Figure 9:
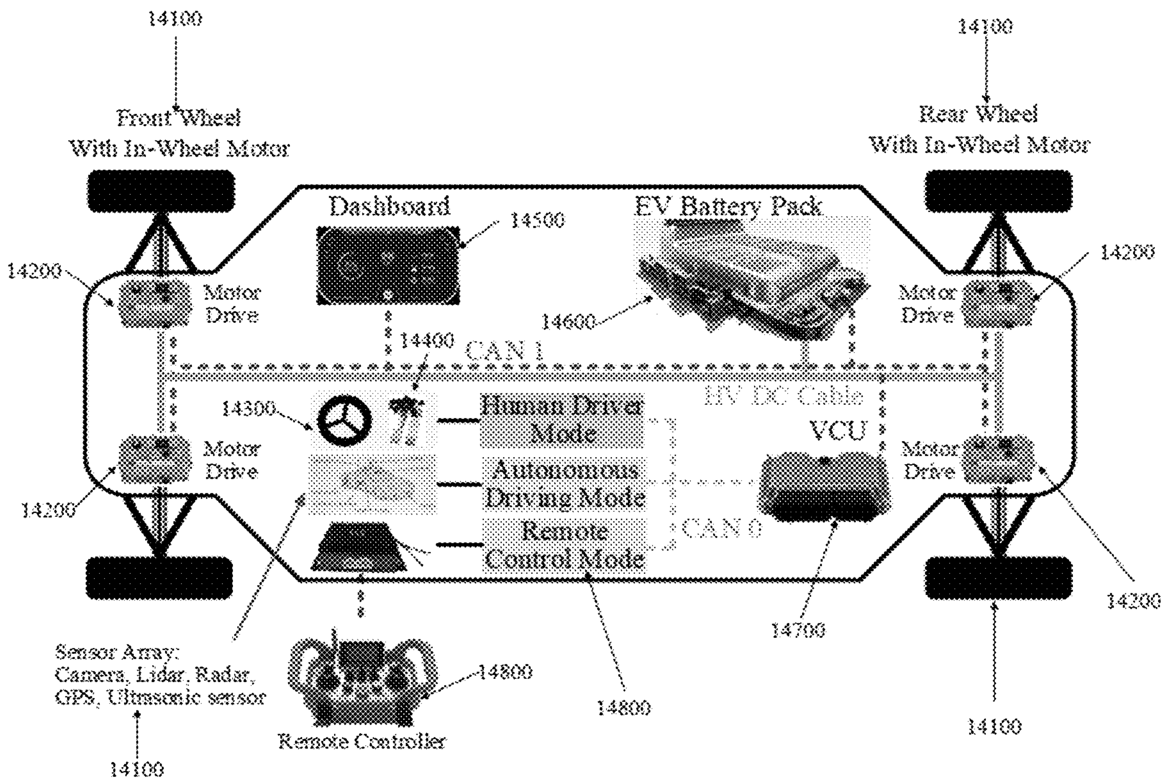
FIG. 9 shows a fully wire-controlled skateboard chassis.

FIG. 9 shows a simple differential speed steering model schematic illustration of the vehicle's structural design, engineered to highlight the complex and modular characteristics of the differential steering system. FIG. 9 emphasizes two in-wheel motors 14200 attached to the front driving wheels 14100, each featuring an integrated braking system. In addition, the design includes a set of engaged wheels that enhance the vehicle's stability and maneuverability. The vehicle has a reality dashboard 14500, a battery module 14600 and a car central controller unit 14700. Embedded within this structure are feedback loops. These feedback loops serve to dynamically adjust the vehicle's operational parameters and promote safer and more precise navigation. With the help of a differential speed controller 14800, the vehicle can achieve differential speed steering by carefully controlling voltages supplied to the pair of front in-wheel motors that allow for real-time trajectory adjustments.

Figure 11:
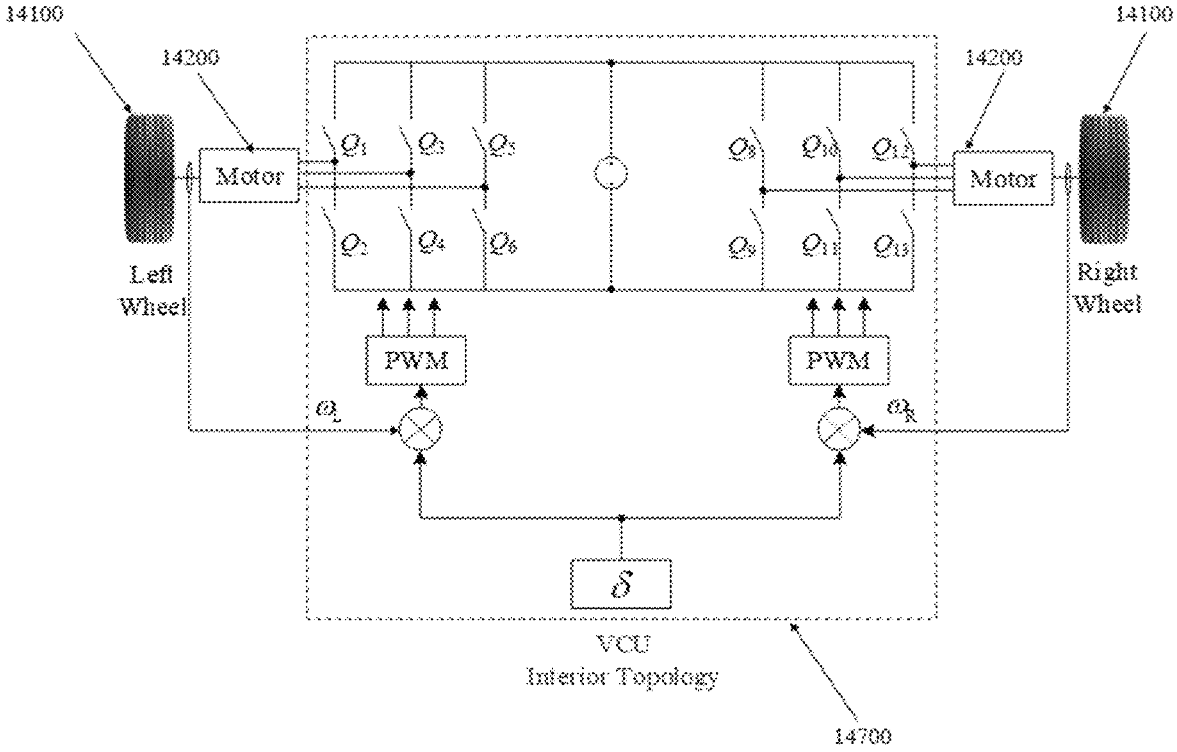
FIG. 11 shows an interior topology of a vehicle control unit (VCU) for a differential speed steering case.

In the field of autonomous vehicular technology, the advent of differential speed steering has emerged as a crucial innovation that is designed as an alternative to augment maneuverability during lateral and circular movements. This technological advancement has been instrumental in enhancing the navigational trajectory of the vehicle and has potential implications for improved energy efficiency and safety measures. The underlying framework of this system is predicated on precise spatial positioning of the vehicle, which is achieved through the meticulous modulation of voltages supplied to individual motors. These motors, in turn, actuate the left and right driving wheels, thereby facilitating the vehicle's movement and direction. As depicted in FIG. 11, this complex arrangement of components forms the backbone of the autonomous vehicular system, underscoring the importance of differential speed steering in the broader context of vehicular navigation and control.

Figure 12:
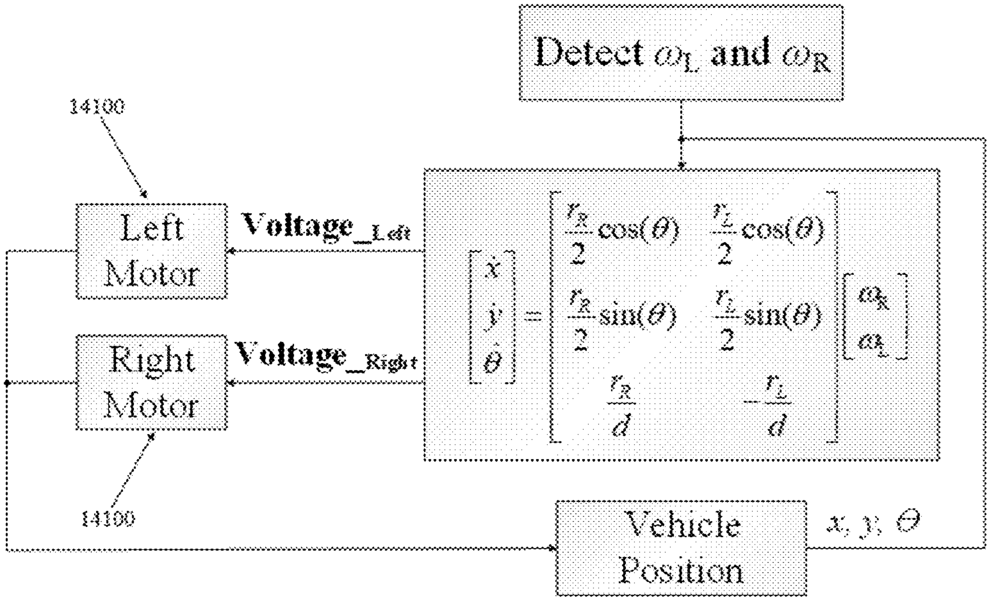
FIG. 12 shows an experimental setup for testing the differential speed steering.

An experimental prototype includes a specialized control interior topology 14700 (see FIGS. 9 and 11) that has been integrated and demonstrated in FIG. 12. This validation process is based on the application of forward kinematics equations. Forward kinematics is a fundamental concept in robotics and mechanical systems and involves the computation of the position and orientation of a certain point in space and gives the values of certain variables. For the vehicle presented here, these equations are utilized to determine its spatial orientation in real-time. By leveraging the principles of forward kinematics, a robust and reliable method for determining the vehicle's orientation is established. This method will significantly enhance the control and maneuverability of the vehicle, and thus contributes to the overall performance and safety of the system. The results from this experimental prototype provide valuable insights and pave the way for future advancements in vehicle control systems.

Referring to FIGS. 2-3, local planning module 13400 is the trajectory collection and path smoothing module. Submodule 13410 collects trajectories based on human drivers, including position, speed, acceleration, and time information. a joint optimization module to transform the path of the human driver into an optimization problem by establishing a cost function that considers the distance between the adjacent discrete positions generated by a human driver. Submodule 13420 extracts the position information of the human driver based on the driver's trajectory. A vector is established in the vertical direction of each path point as the reference path. The distance moving along the direction of the vector is taken as the optimization variable. The cost equation is established for the optimal solution, and the smooth path based on the minimum curvature is obtained.

After applying the path optimization control, the corresponding smoothed points are denoted as $\vec{s}_z=\vec{r}_z+\vec{\alpha}_z\vec{n}_z$ (z=1,2, . . . , N), where $\vec{n}_z$ is the normal vector per unit length, and $\alpha_z$ shown in (1) denotes the distance moved along boundary regions (road boundaries) 13420 in the direction of the normal vector, and is decided by the width of the road $w_{z,road,left}$, $w_{z,road,right}$ and the vehicle's width $w_{car}$. $\alpha_z$ is also established as a constraint with the objective of procuring the most seamless path. This constraint plays a crucial role in ensuring the smoothness of the path, thereby enhancing the efficiency and effectiveness of the optimization process.

$$\alpha_z \in \left[-w_{z,road,left} + \frac{w_{car}}{2},\ w_{z,road,right} - \frac{w_{car}}{2}\right],\ \forall\ 1 \le z \le N \quad (1)$$

A third-order spline should fit each segment to find the optimal point $\vec{s}_z$ in the smooth path for each segment. The optimization uses the x direction as an example, and its derivative is (2), analogous to the y direction.

$$\begin{cases} x_z(t) = b_z + c_z t + d_z t^2 + e_z t^3 \\ x'_z(t) = c_z + 2d_z t + 3e_z t^2 \\ x''_z(t) = 2d_z + 6e_z t \end{cases} \quad (2)$$

The path optimization problem can be reduced to minimizing the total curvature acquisition, as (3) shows.

$$\text{minimize: } \sum_{z=1}^{z=N} \kappa_z^2,\ \kappa_z^2 = \frac{x_z'^2 y_z''^2 - 2x_z' x_z'' y_z' y_z'' + y_z'^2 x_z''^2}{\left(x_z'^2 + y_z'^2\right)^3} \quad (3)$$

Referring to FIGS. 2-3, module 13500 is responsible for the generation of the optimal efficiency of the motor. This is achieved by utilizing the reference speed and acceleration, which are procured from the local planning module 13400. Submodule 13510, a component of module 13500, is tasked with the creation of a region that is encapsulated within the motor energy efficiency diagram. This region is generated based on the reference speed and acceleration. Subsequently, submodule 13520 takes the region produced by submodule 13510 and transforms it into a range for the motor torque and speed. The final component, submodule 13530, generates the torque and speed range. This is based on the output from submodule 13520. The specifics of this process are outlined in Algorithm 1. The torque is then converted into an acceleration and speed interval reserve. This conversion is dependent on the performance parameters of the vehicle body. Algorithm 1 is designed to provide the generation of acceleration boundaries with optimal motor efficiency. It represents a control flow that originates from submodule 13520 and culminates at submodule 13530. This comprehensive process ensures the efficient operation of the motor, contributing to the vehicle's overall performance.

In the process of modeling the longitudinal behavior of an electric vehicle, various forces acting on the vehicle are taken into account. These forces can be broadly categorized into two groups: the driving force that propels the vehicle forward, and the resistance forces that counteract this motion. The driving force is primarily responsible for the vehicle's acceleration and of course is a critical component in the overall dynamics of the vehicle. It is the primary force that propels the vehicle forward and is directly influenced by the power output of the vehicle's motor. On the other hand, the resistance forces arise due to various driving conditions and act in opposition to the driving force. The rolling resistance, denoted as $F_{rr}$, is essentially the frictional force experienced by the tires as they move against the road surface. This force is a function of the type of tires used, the condition of the road, and the speed of the vehicle. The climbing force, denoted as $F_c$, is the force exerted by gravity when the vehicle is moving on a slope. The magnitude of this force is dependent on the steepness of the slope and the weight of the vehicle. The Aerodynamic Resistance, denoted as $F_\alpha$, is the force exerted by the air pressure on the vehicle as the vehicle moves. This force is influenced by the shape and size of the vehicle, as well as its speed. By considering these forces, a more accurate and comprehensive model of the vehicle's longitudinal behavior can be developed. This model can then be used to optimize the vehicle's performance and efficiency under various driving conditions.

$$m\dot{v} = \frac{T}{r} - \left(\underbrace{\mu_{rr}\text{mgcos}(\theta)}_{F_{rr}} + \underbrace{\text{mgsin}(\theta)}_{F_c} + \underbrace{\frac{1}{2}\rho A_f C_d v^2}_{F_a}\right) \quad (4)$$

(4) is a model that shows how the vehicle moves forward. In this model, m is the vehicle's mass, v is the vehicle's speed, T is the force that pushes the vehicle, r is the wheel's diameter, $g=9.8\ \text{m/s}^2$ is the gravity's acceleration, $\theta$ is the road's angle, and $\rho=1.206\ \text{kg/m}^3$ is the air's mass per volume. In this model, T is from the electric motor, and we can calculate T, by using (5). In (5), we use $n_d$, which is a constant in Tab I, and $\eta_m$, which is the motor's performance.

$$T_m = \frac{T}{n_d \eta_m} \quad (5)$$

TABLE 1

Specifications of the electrical vehicle

| Component | Parameters | |
|---|---|---|
| Aerodynamic drag coefficient. | $C_d$ | 0.32 |
| Rolling resistance coefficient. | $\mu_{rr}$ | 0.007 |
| Frontal area | $A_f(\text{m}^2)$ | 2.01 |
| Wheel radius | r(m) | 0.3125 |
| Wheel inertia | $I_{wheels}(\text{km/m}^2)$ | 0.25 |
| Final drive ratio | $n_d$(m) | 7.94 |
| Motor max power | (kW) | 84 |
| Motor max torque | (Nm) | 280 |
| Motor inertia | $(\text{km/m}^2)$ | 0.03 |
| Battery capacity | (kWh) | 24 |
| Battery normal voltage | (V) | 374 |
| Electric constant power | (kW) | 0.2 |
| Vehicle mass | (kg) | 1515 |

Referring to FIG. 4, the motor efficiency map 13521 is generated through using motor CAD too. The motor's efficiency $\eta_m$ depends on the motor's angular speed $\omega_m$ and $T_m$, the input power $P_i$ can be calculated through (6). Besides, the relationship between $\omega_m$ and v is depicted as (7).

$$P_i = \frac{T_m \omega_m}{\eta_m} \quad (6)$$

$$\omega_m = \frac{60 v n_d}{2\pi r} \quad (7)$$

Referring to FIG. 5, the process begins by integrating the optimized path, which is determined through a comprehensive analysis of the vehicle's forces. This integration is performed in conjunction with the constraints of energy efficiency to ensure that the vehicle's trajectory remains within the optimal range for energy utilization. Following this, a relationship is derived between the vehicle dynamics model and the motor. This derivation is based on equations (4) and (5), which provide a mathematical representation of the vehicle's dynamics and the motor's operation, respectively. The final step involves determining the optimal acceleration range. This is achieved by applying the control principle outlined above, in conjunction with Algorithm 1. The control principle and algorithm work in tandem to calculate the acceleration range that will yield the highest level of energy efficiency.

In summary, this process combines path optimization, force analysis, and energy efficiency constraints to maintain an optimal trajectory. The process then uses mathematical models to derive a relationship between vehicle dynamics and motor operation, ultimately determining the optimal acceleration range through the application of a specific control principle and algorithm. This comprehensive approach ensures the vehicle operates at peak energy efficiency.

Algorithm 1: Acceleration boundary generation with optimal efficiency

Input:
$s'_{ref}$: Reference velocity
$s''_{ref}$: Reference acceleration
$\text{map}_{motor}$: Efficiency map of in-wheel motor
$r_{vehicle}$: wheel radius of vehicle
$g_i$: Gear ration from motor to wheel -continued

| Algorithm 1: Acceleration boundary generation with optimal efficiency | |
|---|---|
| Output: | [$s''_{min}$, $s''_{max}$]: Acceleration boundary with optimal efficiency |
| 1. | $\omega_{ref}$ = ConvertRefVelocityToMotorSpeed($s'_{ref}$, $g_i$) |
| 2. | $T_{ref}$ = ConvertRefAccelerationToMotorToque($s''_{ref}$, $g_i$) |
| 3. | $\eta_{ref}$ = GetCurrentEfficiency($\omega_{ref}$, $T_{ref}$) |
| 4. | $\eta_{boundary}$ = GetOptimalEfficiencyBounday($\eta_{ref}$) |
| 5. | [$T_{min}$, $T_{max}$] = GetMortorTorqueBoundary($\omega_{ref}$, $\eta_{boundary}$, $g_i$) |
| 6. | [$s''_{min}$, $s''_{max}$] = ConveToAccelerationBoundary([$T_{min}$, $T_{max}$], $s'_{ref}$, $g_i$ ) |
| 7. | return [$s''_{min}$, $s''_{max}$] |

FIG. 6 serves as a visual representation of the transformation process of the reference trajectory into the speed-time (ST) graph. This graph is a crucial tool as it exhibits the vehicle's velocity in relation to time. The control methodology employed operates under the assumption that within a specified region; there exists a point of optimal efficiency. It is also assumed that points in close proximity to this optimal point are deemed acceptable for the purposes of this analysis. In essence, the process involves a comprehensive transformation of the reference trajectory, rigorous testing of region sizes, and the derivation of an optimization equation, all aimed at enhancing the vehicle's performance and efficiency. This academic and professional approach ensures a thorough and precise analysis.

$$\begin{aligned}\text{cost} = {} & w_{s\_ref} * \sum_{k=0}^{n-1}(s_k - s_{ref})^2 + w_{s\_end} * (s_{n-1} - s_{end})^2 + \\ & w_{ds} * \sum_{k=0}^{n-1} s_k'^2 + w_{ds\_ref} * \sum_{k=0}^{n-1}(s_k' - ds_{ref})^2 + w_{dds} * \sum_{k=0}^{n-1} s_k''^2 + \\ & w_{ddds} * \sum_{k=0}^{n-1} s_k'''^2 + w_{ds\_end} * (s_{n-1}' - s_{end}')^2 + w_{dds\_end} * (s_{n-1}'' - s_{end}'')^2\end{aligned} \tag{8}$$

where $w_{s\_ref}$ and $w_{s\_end}$ are the position weight of the reference point and the end position, $w_{ds}$, $w_{ds\_ref}$, and $w_{ds\_end}$ are the weight of the generated speed, the reference speed, and the endpoint speed, $w_{dds}$, $w_{ddds}$, and $w_{dds}$ end are the acceleration weights of the generated one.

In the study presented, we selected a scenario involving a left turn to demonstrate the efficacy of our methodology. The results of this case study are visually represented in the efficiency map depicted in FIG. 7. The red curve in the figure symbolizes the vehicle's velocity when a human operator engages the accelerator pedal. It is observed that the vehicle does experience acceleration, however, the process lacks smoothness, indicating room for improvement. In contrast, the blue curve represents the vehicle's velocity post the implementation of our enhancement measures. The improved acceleration process is noticeably smoother, closely mirroring the driving style typically exhibited by a human operator. This not only enhances the driving experience but also contributes to energy conservation. The energy conservation is achieved by maintaining the efficiency of the motor at a consistently high and stable level. This is a significant improvement over the previous state, represented by the red curve, where the motor's efficiency varied excessively, leading to higher energy consumption.

In summary, through the careful selection of a left turn scenario and the application of our improvement measures, we have been able to enhance the vehicle's acceleration process to more closely match human driving styles, while also achieving significant energy conservation. This is clearly demonstrated in the efficiency map, where the difference between the original state (red curve) and the improved state (blue curve) is starkly visible. This academic and professional approach ensures a thorough and precise analysis.

FIG. 2 shows the schematic of module 13500 that generates the optimal autopilot trajectory based on human trajectory information. Submodule 13540 generates trajectory optimization constraints that are the driving control parameters including position, speed, acceleration limit, initial point, end point limit, position of each connection point, and speed limit. Submodule 13550 generates the cost equation based on the conditional constraints produced by submodule 1354 and focuses on the factors of position, velocity, acceleration, and acceleration. The optimization uses a weight factor. Each factor is assigned a weight, including the weight of the position of the reference point, the weight of the position of the endpoint, the weight of the generation speed, the weight of the reference point speed, the weight of the endpoint speed, and the weight of the generated acceleration. The weight of the generated point plus acceleration and the weight of the reference point speed can be adjusted according to performance requirements in the process of automatic driving to adapt to different driving behaviors and energy saving. To convert the constraints generated by submodule 13540 and the cost function generated by submodule 13550 into the form of quadratic programming, joint optimization submodule 13560 calls the joint optimizer, sets the parameters of the optimizer reasonably, and then solves it to obtain the optimal trajectory.

The optimization equation is transformed into a quadratic programming form shown in (9), and solved using OSQP, or other optimizers.

$$\frac{1}{2}x^T P x + Q \tag{9}$$

$$P = \begin{bmatrix} P_s & 0 & 0 \\ 0 & P_s' & 0 \\ 0 & 0 & P_s'' \end{bmatrix} \in R^{3m\times 3m}$$

$$P_s = \begin{bmatrix} w_{s\_ref} & \dots & 0 \\ \vdots & \ddots & \vdots \\ 0 & \dots & w_{s\_ref} + w_{s\_end} \end{bmatrix}$$

$$P_s' = \begin{bmatrix} w_{ds} + w_{ds\_ref} & \dots & 0 \\ \vdots & \ddots & \vdots \\ 0 & \dots & w_{ds} + w_{ds\_ref} + w_{ds\_end} \end{bmatrix} \in R^{m\times m}$$

$$P_s'' = \begin{bmatrix} \mathcal{B}_2 & 0 & \dots & 0 & 0 \\ -2*\mathcal{B} & \mathcal{B}_3 & \dots & 0 & 0 \\ \vdots & \vdots & \ddots & \vdots & \vdots \\ 0 & 0 & \dots & \mathcal{B}_3 & 0 \\ 0 & 0 & \dots & -2*\mathcal{B} & \mathcal{B}_2 + w_{dds\_end} \end{bmatrix}$$

$$\mathcal{B}_1 = \frac{w_{ddds}}{dt^2}, \mathcal{B}_2 = w_{dds} + \mathcal{B}_1, \mathcal{B}_3 = w_{dds} + 2*\mathcal{B}$$

$$Q = [-2*\mathcal{R}_1 \ \dots \ -2\mathcal{R}_1 + \mathcal{R}_3 - 2R_2 \ \dots -2\mathcal{R}_2 + \mathcal{R}_4 \ 0 \ \dots \ \mathcal{R}_5]^T \in R^{m\times 3m}$$

$$\mathcal{R}_1 = w_{s\_ref} * s_{ref}, \mathcal{R}_2 = w_{ds\_ref} * ds_{ref}, \mathcal{R}_3 = w_{s\_end} * s_{end}$$

$$\mathcal{R}_4 = w_{ds\_end} * s_{end}', \mathcal{R}_5 = w_{dds\_end} * s_{end}''$$

where P is a 3m×3m matrix, Q is an m×3m matrix, R represents a set of real numbers, and $P_s$, $$P_s'$$

and $$P_s''$$

are all m×m matrix. Thus, based on the optimal efficiency map of the motor, constraints can be achieved in (10) by using Algorithm 1 shown above.

$$\begin{cases} s_{low} \le s \le s_{up},\ s'_{low} \le s' \le s'_{up},\ s''_{low} \le s'' \le s''_{up} \\ s_{k+1} = s_k + dt * s'_k + \frac{1}{3}dt^2 * s''_k + \frac{1}{6}dt^3 * s''_{k+1} \\ s'_{k+1} = s'_k + \frac{1}{2}dt * s''_k + \frac{1}{2}dt * s''_{k+1} \\ s_0,\ s'_0,\ s''_0 = x_{init},\ s_{n-1},\ s'_{n-1},\ s''_{n-1} = x_{end} \end{cases} \tag{10}$$

Referring to FIG. 2 and FIG. 8, 13600 is an accurate path-tracking module based on the local planning (trajectory collection and path smoothing) 13400 module and the trajectory generation module and uses a two-layer MPC path-tracking algorithm 13610. Submodule 13610 is the trajectory tracking algorithm of module 13600, which adopts a two-layer control framework. Submodule 13611 obtains real-time vehicle status, including position, speed, and front wheel angle information. Submodule 13612 obtains the optimal trajectory based on human driver information generated by a combination of modules 13400, 13500. Submodule 13614 is an outer MPC controller that generates optimal speed and acceleration information based on vehicle kinematic constraints combined with reference trajectories. Submodule 13615 is a fuzzy controller. The trajectory duration and a number of control steps of submodule outer controller 13616 can be obtained in real-time or dynamically adjusted according to the deviation information of submodule 13614 output from the reference trajectory, so as to reduce the increase of calculation amount caused by an excessive number of steps under stable control conditions. Submodule 13617 is an inner controller. Based on the optimal speed, prediction time, and control time generated by submodules 13614 and 131615, combined with vehicle dynamics constraints, the cost equation of high efficiency, energy saving, and safety is established and transformed into a quadratic programming problem. After optimization, the optimal front wheel angle is obtained. Submodule 13618 is a mechanical and dynamic limit for AVs. The differential steering executive mechanism, 13613, converts the optimal speed and steering control quantity from submodule13614 and 13617 into execution signals. The steering radius of differential steering is calculated by submodule 13617 from the optimal steering control quantity. The main function of this mechanism is to achieve real-time, stable, and accurate differential steering control. Submodule 13613 is the optimal speed and front wheel angle generated based on submodules 13614 and 13616, which are converted into signals that can be executed by the autonomous vehicle for real-time vehicle control.

Figure 13:
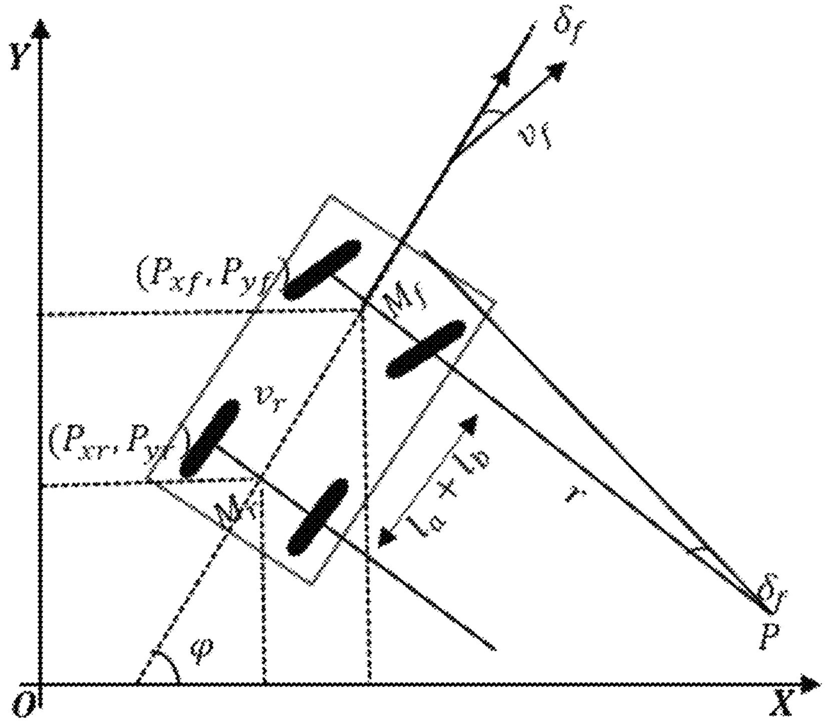
FIG. 13 shows a bicycle model widely used in kinematics model analyses.

Referring to FIG. 8, the outer ring MPC is constructed based on a comprehensive analysis of the kinematic model. This model serves as a mathematical representation of the vehicle's motion, providing a detailed understanding of its dynamics. The state update equation, which is integral to this layer of the model, is provided in Equation (11). This equation is a mathematical expression that describes how the state of the system changes over time. It is a key component of the model, providing a means to predict the future state of the vehicle based on its current state and control inputs. The state variables in this context include the vehicle center coordinate (x, y), which represents its position in the plane; the heading angle T, which indicates the direction in which the vehicle is moving; the vehicle speed v and acceleration a; and the front wheel angle δ, represents the angle at which the front wheels are turned, which directly influences the vehicle's direction of movement. Each of these variables plays a crucial role in the vehicle's motion and control. A bicycle model shown in FIG. 13 is well-established and widely used in the kinematics model analysis.

$$\begin{cases} x_{t+1} = x_t + \dot{v}_t * \cos(\varphi_t) * dt \\ y_{t+1} = y_t + \dot{v}_t * \sin(\varphi_t) * dt \\ \varphi_{t+1} = \varphi_t + \frac{\dot{v}_t}{l_a}\delta_t * dt \\ \dot{v}_{t+1} = \dot{v}_t + a_t * dt \end{cases} \tag{11}$$

The error calculation is shown in Equation (12). It is the performance factor of the vehicle navigation. The formulation consists of both positional and orientational precision check. (12) contains two primary components: the cross-track error, cte, is defined as the lateral distance between the vehicle's current position and the center of the road. This error quantifies the deviation of the vehicle from the intended path and provides a measure of the vehicle's navigation performance. The orientation error, $e\psi_t$, quantifies the discrepancy between the desired orientation and the actual orientation of the vehicle. This error takes into account the change in orientation caused by the vehicle's movement and provides a measure of the precision of the vehicle's steering. Additionally, $f(x_t)$ represents the cubic polynomial curve fitting equation of the reference trajectory. This equation provides a mathematical model of the desired path of the vehicle, serving as a reference for the vehicle's navigation and control systems.

$$\begin{cases} e\psi_{t+1} = \psi_t + \frac{\dot{x}_t}{l_a}\delta_t * dt - \tan^{-1}(f'(x_t)) \\ cte_{t+1} = f(x_t) - y_t + \dot{x}_t * \sin(e\psi_t) * dt \end{cases} \tag{12}$$

Equation (13) describes the cost function making use of the outer layer model predictive control (MPC) controller. A notable aspect of this cost function is that it is implemented with energy consumption monitoring as a key factor. As a result, the cost function ensures that the controller's decisions not only aim to achieve the desired control objectives but also strive to minimize energy usage. The equation includes a weight factor w which governs the cost function of each aspect.

$$J = \sum_{t=1}^{N}\left(w_{cte}\|cte_t\|^2 + w_{e\varphi}\|e\varphi_t\|^2 + w_v\|v_t - v_{target}\|^2\right) + \sum_{t=1}^{N-1}\left(w_\delta\|\varphi_t\|^2 + w_a\|a_t\|^2\right) + \sum_{t=2}^{N-1}\left(w_{rate_\delta}\|\delta_t - \delta_{t-1}\|^2 + w_{rate_{\delta a}}\|a_t - a_{t-1}\|^2\right) \tag{13}$$

The dynamics constraints are given the acceleration limitations that are major parameters in the vehicular path tracking. These constraints are mathematically represented as $a \in [a_{min}, a_{max}]$. Moreover, the initial state of the vehicle is defined as X=(x, γ, φ, ẋ, cte, eφ). Subsequent to the initialization of the vehicle's state, the real-time speed of the vehicle can be computed. This computation leverages the first value produced by the IPOPT (interior point optimizer)

algorithm. The IPOPT optimizer is a software package designed for large-scale nonlinear optimization and is particularly effective in this context due to its ability to handle sparse Hessian structures and exploits second-order information, thereby providing a robust and efficient solution. The real-time speed calculation is thus an important component of the path-tracking process. It enables the vehicle to adapt to dynamic changes in its environment and maintain its intended trajectory.

Figure 14:
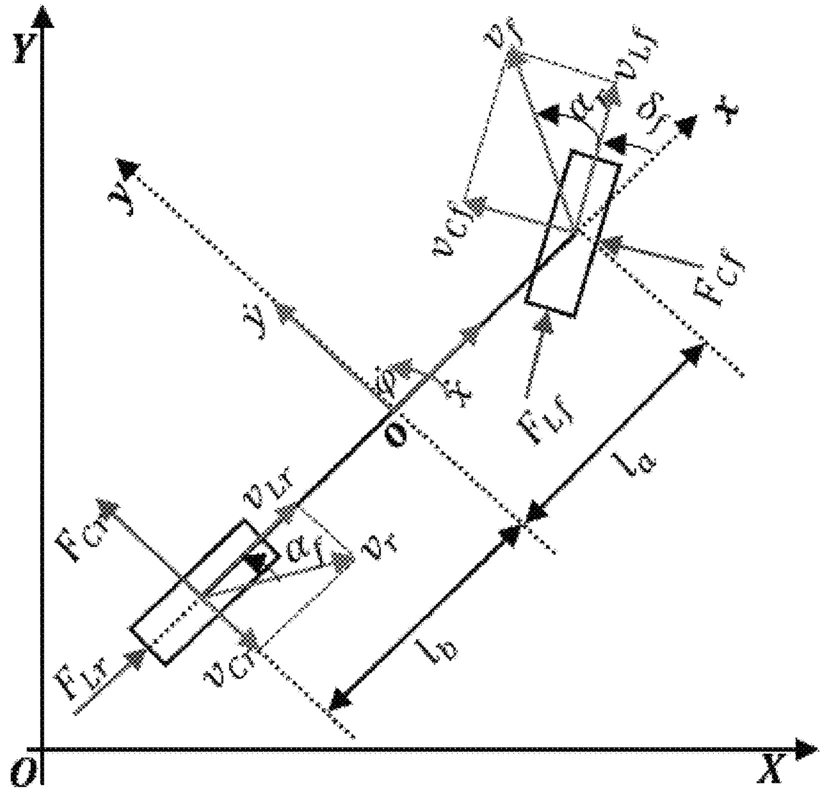
FIG. 14 shows a vehicle dynamics model of a vehicle.

FIG. 14 shows a vehicle dynamics model of the vehicle. In the construction of the inner ring of the model predictive control (MPC), the state variable vector is denoted as $S=[\dot{x}, \dot{\gamma}, \varphi, \dot{\varphi}, X, Y]^T$. Subsequently, the output variable is represented as $0=[\varphi, Y]^T$. The control variable in this context is denoted as $u=\delta_f$. With these definitions in place, we can derive the discrete equation, referred to as Equation (14). This equation is an important component of the MPC, providing a mathematical model that describes the dynamics of the vehicle. It is used to predict future states of the vehicle and determine the optimal control inputs to minimize a predefined cost function, thereby enabling the vehicle to follow the desired trajectory while adhering to physical constraints. The derivation and specifics of Equation (14) would depend on the exact dynamics of the vehicle and the formulation of the MPC problem.

$$\begin{cases} \dot{S} = AS + Bu \\ O = CS \end{cases} \tag{14}$$

$$A = \begin{bmatrix} \frac{2C_{Cf}\delta_f E_a}{m(\dot{x})^2} & \dot{\varphi} - \frac{2C_{Cf}\delta_f}{m\dot{x}} & 0 & \dot{y} - \frac{2C_{Cf}l_a\delta_f}{m\dot{x}} & 0 & 0 \\ E_a & \frac{2C_{Cf} - 2C_{Cr}}{m\dot{x}} & 0 & -\dot{x} + \frac{E_l}{m\dot{x}} & 0 & 0 \\ 0 & 0 & 0 & 1 & 0 & 0 \\ E_b & \frac{E_l}{I_z\dot{x}} & 0 & \frac{2\left(C_{Cf}l_a^2 - C_{Cr}l_b^2\right)}{I_z\dot{x}} & 0 & 0 \\ \cos\varphi & -\sin\varphi & -\dot{x}\sin\varphi - \dot{y}\cos\psi & 0 & 0 & 0 \\ \sin\varphi & \cos\varphi & \dot{x}\cos\varphi - \dot{y}\sin\varphi & 0 & 0 & 0 \end{bmatrix}$$

$$E_a = -\dot{\varphi} - \frac{2C_{Cf}(\dot{y} + l_a\dot{\varphi}) + 2C_{Cr}(l_b\dot{\varphi} - \dot{y})}{m(\dot{x})^2}$$

$$E_b = \frac{2l_bC_{Cr}(l_b\dot{\varphi} - \dot{y}) - 2l_fC_{Cf}(\dot{y} + l_a\dot{\varphi})}{I_z(\dot{x})^2}$$

$$E_l = 2(C_{Cf}l_a + C_{Cr}l_b)$$

$$B = \begin{bmatrix} \frac{2C_{Cf}}{m}\left(2\delta_f - \frac{\dot{y} + l_a\dot{\varphi}}{\dot{x}}\right) \\ \frac{2(C_{Lf}s_f - C_{Cf})}{m} \\ 0 \\ \frac{2l_a(C_{Lf}s_f - C_{Cf})}{I_z} \\ 0 \\ 0 \end{bmatrix}, C = \begin{bmatrix} 0 & 0 & 1 & 0 & 0 & 0 \\ 0 & 0 & 0 & 0 & 0 & 1 \end{bmatrix}$$

Then the linearization model can be yielded in (15), $$\begin{cases} S(k+1) = A_kS(k) + B_ku(k) \\ O(k+1) = CS(k) \end{cases} \tag{15}$$

Here, $A_k=I+TA$, $B_k=TB$ where T is the sampling time. Because of mechanical limitations of the vehicle, the change in the front steering angle, denoted as, $\Delta\delta_f$, has been included into the control state. This consideration ensures that the control inputs are feasible and do not exceed the physical capabilities of the vehicle. A new state $\tilde{S}(k)$ which is a combination of the current state variable S(k), and the previous control variable u(k-1) is then used. This formulation allows us to incorporate the history of control inputs into the state and provides a more accurate representation of the vehicle's dynamics. Consequently, the updated state equation, represented as Equation (16), is derived. This equation provides a full model of the vehicle's dynamics with the consideration of both the current state and the previous control input. The specifics of Equation (16) would depend on the exact dynamics of the vehicle and the formulation of the control problem. It is an important component of the control algorithm to generate feasible and effective control inputs that guide the vehicle along the desired trajectory.

$$\begin{cases} \tilde{S}(k+1) = \tilde{A}_k\tilde{S}(k) + \tilde{B}_k\Delta u(k) \\ \tilde{O}(k) = \tilde{C}_k\tilde{S}(k) \end{cases} \tag{16}$$

$$\tilde{A}_k = \begin{bmatrix} A_k & B_k \\ 0_{m*n} & I_m \end{bmatrix} \tilde{B}_k = \begin{bmatrix} B_k \\ I_m \end{bmatrix} \tilde{C}_k = [\, C_k \;\; 0]$$

m and n are utilized to denote the dimensions of the state matrix and control matrix, respectively. Given these definitions and the prediction horizon, the state equations can be formulated. These equations provide a mathematical model that describes how the state of the system evolves over time under the influence of the control inputs. They are fundamental to the operation of the controller, enabling it to predict future states, compute optimal control inputs, and guide the system along a desired trajectory.

$$\begin{cases} \tilde{S}(k+1|k) = \tilde{A}_k\tilde{S}(k) + \tilde{B}_k\Delta u(k) \\ \tilde{S}(k+2|k) = \tilde{A}_{k+1}\tilde{A}_k\tilde{S}(k) + \tilde{A}_k\tilde{B}_k\Delta u(k) + \tilde{B}_{k+1}\Delta u(k+1) \\ \vdots \\ S(k+N_c|k) = f(k, N_c-1, 0)\tilde{S}(k) + f(k, N_c-2, 0) \\ \tilde{B}_k\Delta u(k) + \ldots + \tilde{B}_{k+N_c-1}\Delta u(k+N_c-1) \\ \vdots \\ \tilde{S}(k+N_p|k) = f(k, N_p-1, 0)\tilde{S}(k) + f(k, N_p-2, 0) \\ \tilde{B}_k\Delta u(k) + \ldots + f(k, N_p-N_c, N_c) \\ \tilde{B}_{k+N_c-1}\Delta u(k+N_c-1) \end{cases}$$

where, $$f(k, N, j) = \prod_{i=j}^{N} \tilde{A}_{k+i}.$$

Then, the output variables can be expressed as, $$\tilde{O}(k) = \begin{bmatrix} \tilde{O}(k+1|k) \\ \tilde{O}(k+2|k) \\ \vdots \\ \tilde{O}(k+N_p|k) \end{bmatrix} = \tilde{C}_k \begin{bmatrix} \tilde{S}(k+1|k) \\ \tilde{S}(k+2|k) \\ \vdots \\ \tilde{S}(k+N_p|k) \end{bmatrix}$$

As mentioned before, the new state equation is obtained while $\Delta\delta_f$ is considered the control variable, $$\tilde{O}(k) = \mathcal{F}\,\tilde{S}(k) + \mathcal{M}\,\Delta u(k) \quad (17)$$

$$\mathcal{F} = \begin{bmatrix} \tilde{C}_k\tilde{A}_k \\ \tilde{C}_k\tilde{A}_k^2 \\ \vdots \\ \tilde{C}_k\tilde{A}_k^{N_p} \end{bmatrix},$$

$$\mathcal{M} = \begin{bmatrix} \tilde{C}_k\tilde{B}_k & \ldots & 0 \\ \vdots & \ddots & \vdots \\ \tilde{C}_k\tilde{A}_k^{N_c-1}\tilde{B}_k & \ldots & \tilde{C}_k\tilde{B}_k \\ \vdots & \vdots & \vdots \\ \tilde{C}_k\tilde{A}_k^{N_p-1}\tilde{B}_k & \ldots & \tilde{C}_k\tilde{A}_k^{N_p-N_c-1}\tilde{B}_k \end{bmatrix},$$

$$\Delta u(k) = \begin{bmatrix} \Delta u(k|k) \\ \Delta u(k+1|k) \\ \vdots \\ \Delta u(k+N_c|k) \end{bmatrix}$$

In order to enable the control system to compute the control quantity that facilitates rapid tracking of the desired trajectory, we introduce a cost function, denoted as Equation (18). This cost function is a mathematical representation of the control objectives and serves as the metric that the control system seeks to minimize. The cost function is composed of two primary components. The first component encapsulates the system's ability to adhere to the reference trajectory. This term quantifies the deviation of the system's actual trajectory from the desired trajectory, thereby providing a measure of tracking performance. Minimizing this term ensures that the system closely follows the desired path. The second component of the cost function pertains to the requirement for the steady change of the control quantity. This term penalizes large, abrupt changes in the control inputs, promoting smooth and gradual adjustments. This is crucial for ensuring the stability and robustness of the control system, as sudden changes in control inputs can lead to undesirable dynamics and potentially destabilize the system. By minimizing this cost function, the control system can compute the optimal control inputs that enable the system to track the desired trajectory as closely and smoothly as possible, while adhering to the constraints imposed by the system's dynamics and physical limitations. The specific form of Equation (18) would depend on the exact formulation of the control problem and the system's dynamics.

$$J = \left[\tilde{O}(k) - \tilde{O}_{ref}(K)\right]^T \cdot \mathbb{Q} \cdot \left[\tilde{O}(k) - \tilde{O}_{ref}(K)\right] + \Delta u(k)^T \cdot \mathbb{R} \cdot \Delta u(k) + \rho\epsilon^2 \quad (18)$$

There are several constraints during the whole control, such as the control $\delta_{f_{min}}(k) \le \delta_f(k) \le \delta_{f_{min}}(k)$, the increment $\Delta\delta_{f_{min}}(k) \le \Delta\delta_f(k) \le \Delta\delta_{f_{max}}(k)$, the output $\tilde{O}_{min}(k) \le \tilde{O}(k) \le \tilde{O}_{max}(k)$. Due to the complexity of the dynamic model and the situation that multiple constraints exist at the same time, the relaxation factor ε is added to avoid the failure to obtain the optimal solution within a specified time in the actual execution process. $\mathbb{Q}$ and $\mathbb{R}$ are the weight matrix, and ρ is the weight coefficient.

As shown in FIG. 9, the vehicle's chassis is implemented with in-wheel motors and each motor is of 4 kW rated power. This design eliminates and reduces most of the drive train and minimizes the mechanical loss and improves the reliability. The four in-wheel motors 14100 are strategically distributed and mounted on both the front and rear wheels. Each motor can be independently controlled by its respective motor drive, allowing for advanced driving capabilities and ensuring fault-tolerant operation. The vehicle can be operated in one of three modes: human driving mode, autonomous driving mode, or remote-control mode. In the human driving mode, the VCU 14700 receives driving commands directly from the steering wheel and pedals that effectively bypasses the signals from the other two modes. This mode is typically employed during vehicle testing procedures. In the autonomous driving mode, the VCU 14700 exclusively receives driving commands from the autonomous driving platform. To facilitate this, the vehicle is equipped with a comprehensive array of sensors 14100. These sensors 14100 continuously monitor and sense the real-world driving environment. The data acquired by these sensors 14100 are relayed to an onboard industrial computer. Here, the autonomous driving algorithm processes the sensor data and generates the requisite driving commands.

In the remote-control mode, the VCU 14700 in FIG. 9 only considers the signals from the remote-control receiver as effective. This necessitates wireless communication to facilitate the transfer of signals between the vehicle and the remote controller 14800. This mode is generally employed for testing newly developed algorithms on the vehicle, providing a safe and controlled environment for algorithm validation.

In the field of vehicular dynamics and control, steering mechanisms are of paramount importance, significantly influencing a vehicle's maneuverability. Two of the most commonly employed steering systems are differential steering and the conventional Ackermann steering. Differential steering and Ackermann steering each have their unique advantages and are suited to different driving conditions. In certain scenarios, differential steering can outperform conventional Ackermann steering in terms of maneuverability and control. One of the distinguishing features of differential steering is its ability to enable a vehicle to execute a turn in place and is even reaching a turning radius of zero. This remarkable capability is a unique feature of differential speed steering that is via modulating the relative speeds of its wheels. In a differential steering system, if one wheel is halted or even driven in reverse while the other continues to move forward, the vehicle can execute an extremely sharp turn or even rotate in place. This level of maneuverability is unparalleled in conventional steering systems and can be particularly advantageous in tight or challenging driving conditions. The choice between differential steering and Ackermann steering hinges on the specific requirements of the driving scenario. While Ackermann steering is well-suited to standard driving conditions, differential steering offers superior maneuverability and control in more demanding situations. This underscores the importance of a comprehensive understanding of both steering systems in the pursuit of optimal vehicular control and energy efficiency.

(1). In the pursuit of achieving a dual-pronged objective of augmenting energy efficiency and bolstering mobility in vehicular steering, the proposition of implementing front and rear-wire-controlled Ackerman steering is put forth. This innovative method of steering control is acclaimed for its inherent potential to markedly enhance steering flexibility. This approach's primary objective is optimizing energy consumption during the steering process. By placing a strategic emphasis on energy conservation measures, it becomes feasible to extend the operational range of the vehicle and mitigate its environmental footprint. This aligns seamlessly with the global sustainability goals, underscoring the importance of energy-efficient practices in vehicular design and operation. Simultaneously, this approach is geared towards maximizing the vehicle's mobility. Enhanced mobility can significantly contribute to the vehicle's overall performance, particularly in intricate driving environments that necessitate precise maneuvering.

Figure 15A:
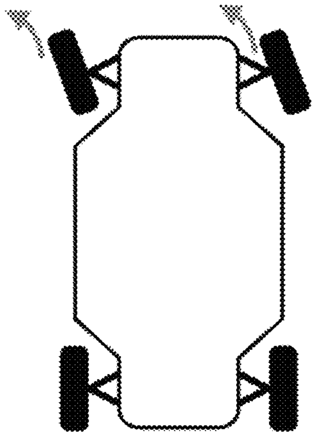
FIGS. 15A-15C show independent control for the front and rear wheels of a vehicle.
Figure 15B:
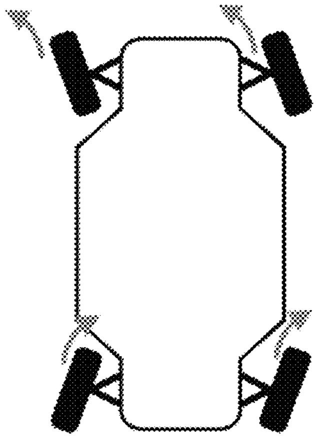
Figure 15C:
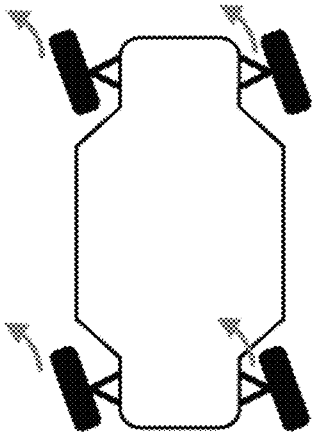

The integration of front and rear wire-controlled steering is a pivotal component of this strategy. This steering mechanism is renowned for its capacity to offer superior steering flexibility in comparison to traditional steering systems. As shown in FIGS. 15A, 15B and 15C, by facilitating independent control of the front and rear wheels, it provides the potential for more precise steering adjustments, thereby improving vehicle handling. This not only enhances the driving experience but also contributes to the safety and efficiency of the vehicle, making it a promising solution for future vehicular designs.

Figure 16A:
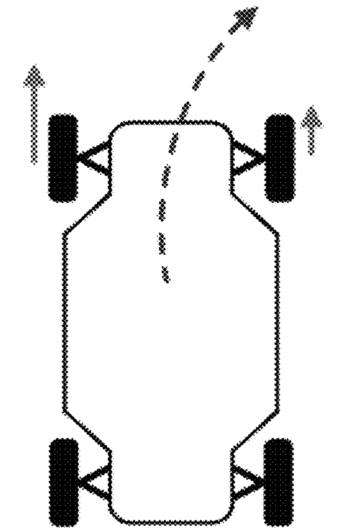
FIGS. 16A-16C show in-wheel motors for each wheel of a vehicle.
Figure 16B:
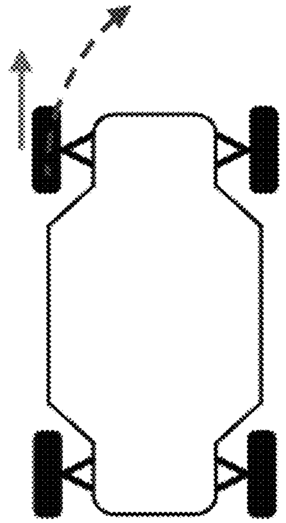
Figure 16C:
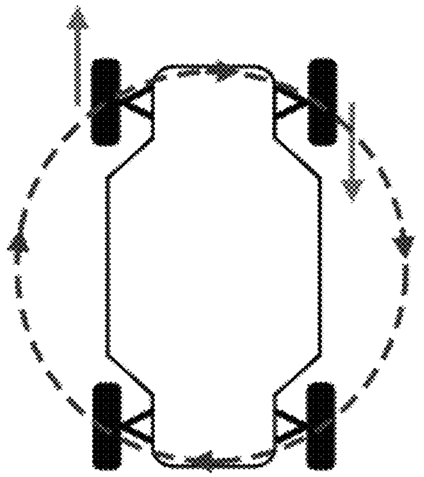

(2). An alternative hardware configuration is proposed to advance the exploration of energy-efficient vehicular control. As shown in FIGS. 16A, 16B and 16C, this configuration uses an in-wheel motor in each wheel of the vehicle. These motors are engineered to function independently in speed and rotational position, thereby it is high degree of control over the vehicle's movement. This independent control of each wheel enables the implementation of speed differential steering, a technique that can be applied to either all four wheels or just two. Speed differential steering is a method that allows for the vehicle's direction to be controlled by varying the speed of its wheels. This technique can significantly enhance the vehicle's maneuverability and responsiveness, thereby improving its overall performance. Given this unique hardware configuration, there are three potential steering schemes that can be investigated for their impact on the vehicle's energy efficiency. These schemes, which are represented in the subsequent figure, provide alternative approaches to steering control. Each scheme possesses its unique advantages and highly energy and power conversion. The first scheme emphasizes the importance of maintaining a balance between energy efficiency and vehicle performance. The second scheme focuses on maximizing energy efficiency, potentially at the expense of some aspects of vehicle performance. The third scheme prioritizes vehicle performance, potentially at the expense of energy efficiency. Each of these schemes offers a unique approach to the challenge of energy-efficient vehicular control, making them worthy of further investigation. The trade-off, we can gain a deeper understanding of the trade-offs involved in vehicular control and identify strategies that can optimize both energy efficiency and vehicle performance.

In conclusion, the integration of energy-saving measures, enhanced mobility, and front and rear wire-controlled steering presents an alternative mechanism to vehicle steering control. This approach improves steering flexibility and contributes to broader energy efficiency and sustainable mobility objectives.

Figure 10:
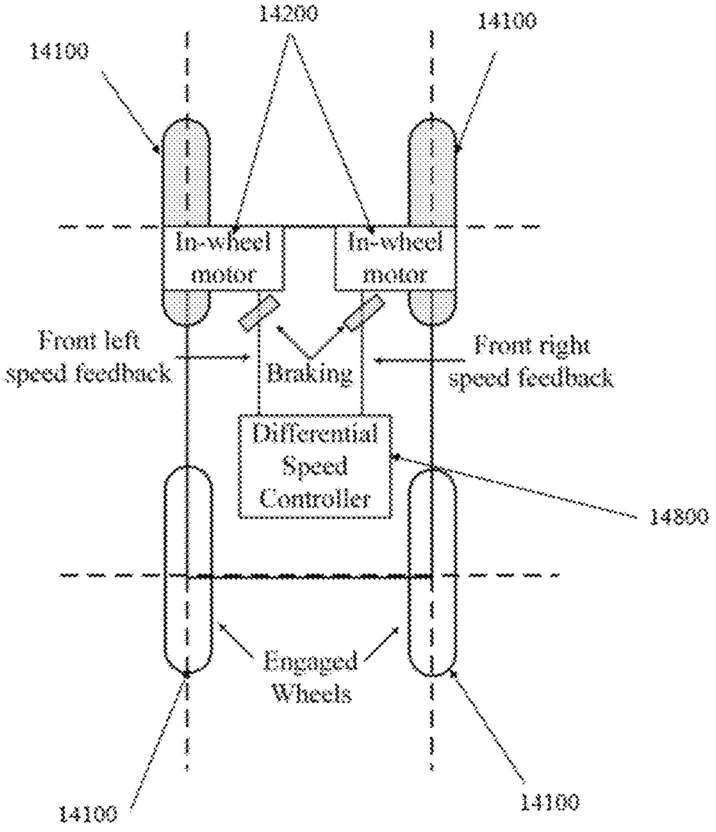
FIG. 10 shows a general model of differential steering control.
Figure 17:
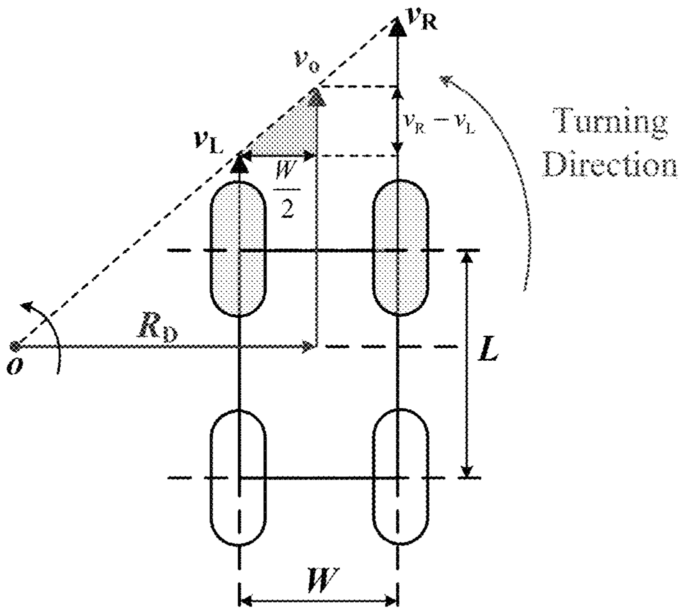
FIG. 17 shows a general model of differential speed controller steering for a vehicle.

Referring to FIG. 10, a simplified model of differential speed steering is presented as a case study. This model is integral to understanding the dynamics of vehicle steering and control. The vehicle chassis is equipped with two motor drives, each independently controlling a front wheel. Each motor drive is further equipped with a brake, allowing for precise control over the vehicle's speed and direction. The chassis also features two rear wheels that enhance the vehicle's stability and facilitating smoother turns. The vehicle incorporates feedback systems, specifically front left speed and front right speed feedback mechanisms. These systems adapt the vehicle's driving behavior based on sensory input that effectively prompt the vehicle to respond instantly to its environment in real time. A key component of the vehicle's control system is the differential speed controller. The different speed controller can modulate the speed and rotational angle power control to the two front motors that provides them the required angular rotation at different speeds. This differential lateral rotation is crucial for the vehicle's turning capability and forward path-following performance. FIG. 17 shows a general model of the differential speed controller steering is provided in Equation (19) and visually represented in the figure below. This model encapsulates the complex interplay between the vehicle's various components and provides a comprehensive understanding of its steering dynamics.

$$R_D/\frac{w}{2} = \frac{v_o\Delta t}{(v_R - v_L)\Delta t} = \frac{v_o}{v_R - v_L} \quad (19)$$

where Δt is the element of the unit time. $v_o$, $v_L$ and $v_R$ are the total velocity, the left front wheel velocity, and the right front wheel velocity, respectively. And the relationship among these velocities is $v_o=(v_R+v_L)/2$. $R_D$ is the turning radius of the differential speed steering and W denotes the wheel thread. Thus, the turning radius of the differential speed steering can be expressed as (20).

$$R_D = \frac{v_R + v_L}{v_R - v_L} \cdot \frac{W}{2} \quad (20)$$

Referring to FIG. 11, a special vehicle control unit (VCU) 14700 is included in the experimental prototype to verify that the real-time spatial orientation of the vehicle can be accurately determined using the forward kinematics equations given in FIG. 12. The VCU 14700 controls the voltage directed to each wheel that provides high-precision wheel speed regulation to meet the control logic of the differential steering control 14800. The interior topology of the VCU 14700 serves as an advanced differential and fulfills the requirements of EVs. The proposed configuration features a dual motor system and each of which is regulated by distinct torque control methods facilitated through two corresponding inverters manufactured by switches 14710. Each inverter 14710 is strategically connected to one wheel 14100, so independent control of each wheel is established. In this setup, the VCU 14700 plays an important role in managing the differences in velocities between the two wheels 14100 during cornering maneuvers. This is achieved by leveraging two key input variables: the vehicle speed and the steering angle. These inputs are used to calculate the necessary velocities for the left and right wheels, thereby ensuring optimal performance during cornering maneuvers. This innovative approach to vehicle control driven by PWM signals 14720 not only enhances the maneuverability and stability of the vehicle but also contributes to improved safety and efficiency. The insights gained from this research could potentially revolutionize the design and operation of future electric vehicles. This study underscores the potential of advanced control systems in enhancing the performance and safety of electric vehicles.

To be controlled by the vehicle chassis 14000, effective and reliable communications are necessary between the battery 14600, motors 14200, drives, VCU 14700, dashboard 14500, and onboard industrial computer. To realize this, the CAN Bus 2.0B communication protocol is adopted. The wire-controlled chassis 14000 receives the command from the autonomous platform and feedback on its status, such as wheel speed, steering angle, and battery 14600 status to the autonomous platform. The autonomous platform can control all the actions it needs, such as start, accelerate, energy feedback brake, mechanical brake, or decelerate and stop. All the control and information exchange functions, such as wheel speed control, brake, steering, dashboard 14500 display, battery management, and remote control, are all based on this Bus. This makes the chassis control and status surveillance easier and more reliable. The skateboard chassis 14000 will make the whole layout easier.

Figure 18:
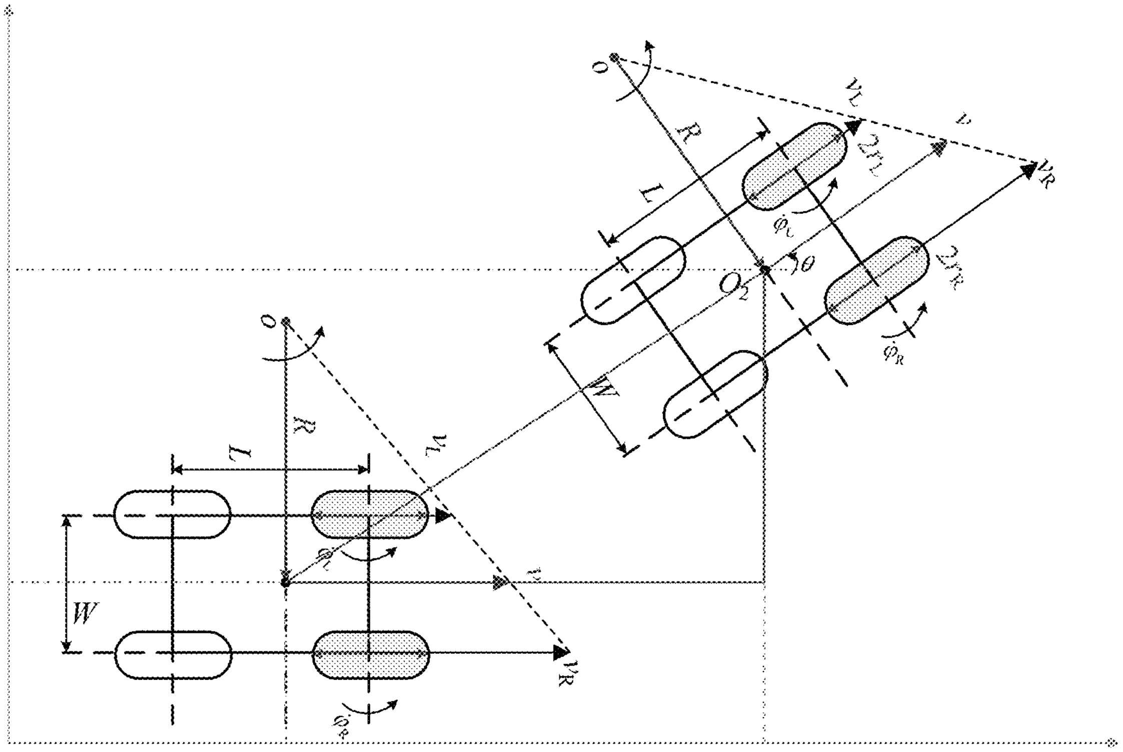
FIG. 18 shows another dynamic model of a vehicle taking into account forward kinematic equations.

FIG. 18 takes into consideration the following forward kinematic equations.

$$\begin{bmatrix} \dot{x} \\ \dot{y} \\ \dot{\theta} \end{bmatrix} = \begin{bmatrix} \frac{r_R}{2}\cos(\theta) & \frac{r_L}{2}\cos(\theta) \\ \frac{r_R}{2}\sin(\theta) & \frac{r_L}{2}\sin(\theta) \\ \frac{r_R}{d} & -\frac{r_L}{d} \end{bmatrix} \begin{bmatrix} \omega_R \\ \omega_L \end{bmatrix} \tag{21}$$

The forward kinematic equation is expressed in (21), which provides a comprehensive mathematical representation of the vehicle's motion, taking into account the key physical parameters and operational characteristics. This equation serves as a foundation for developing advanced control strategies to optimize the vehicle's performance and energy efficiency. In this equation x, y, θ are the differential form of x-axis displacement, y-axis displacement, and angular displacement, respectively. These variables capture the vehicle's movement in a two-dimensional plane and its rotation about its own axis. $r_L$ and $r_R$ are the radius of the left wheel and right wheel, respectively. These parameters are critical as they influence the vehicle's turning radius and, consequently, its maneuverability. The angular velocities of the left and right wheels are represented by $\omega_L=\dot{\varphi}_L$ and $\omega_R=\dot{\varphi}_R$, respectively. These quantities are derived from the time derivatives of the angular positions of the left and right wheels, $\varphi_L$ and $\varphi_R$. The angular velocities play a crucial role in controlling the vehicle's speed and direction.

Figure 19:
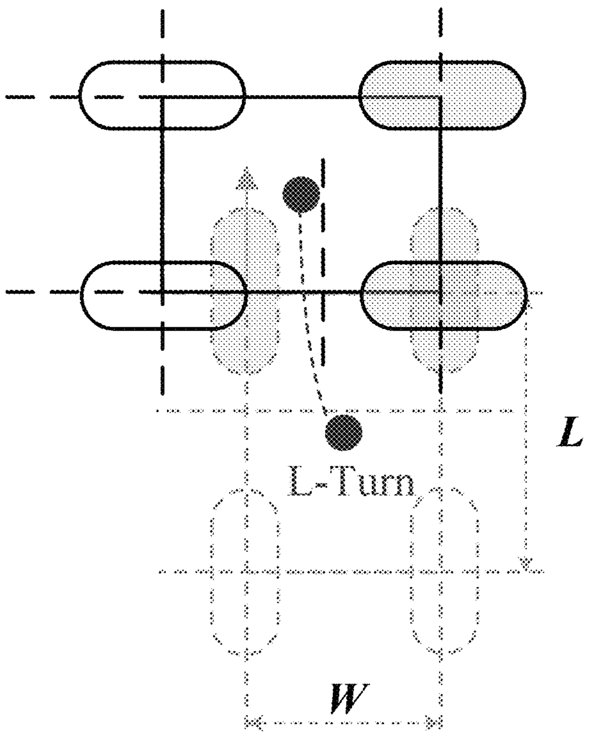
FIG. 19 shows an L-turn for a vehicle with the help of differential steering.

In the case of an L-turn shown in FIG. 19, differential steering can effectively reduce the turning radius by slowing down or even reversing the inner wheel while the outer wheel continues to move forward. This results in a sharp turn, allowing the vehicle to change its direction by 90 degrees. This is particularly advantageous in environments with limited space or in situations where a quick change in direction is required. In the context of executing an L-turn, a maneuver characterized by a 90-degree change in direction, differential steering exhibits a significant advantage. This steering mechanism has the capacity to effectively minimize the turning radius, a critical factor in the maneuverability of the vehicle. This reduction in turning radius is achieved by modulating the speeds of the inner and outer wheels during the turn. Specifically, the speed of the inner wheel is decreased, or in some cases, the wheel is driven in reverse. Simultaneously, the outer wheel maintains its forward motion. The result of this differential wheel speed is a sharp, precise turn, enabling the vehicle to alter its direction by 90 degrees. This capability is particularly beneficial in limited space, necessitating tight turns. Additionally, it proves advantageous in situations that demand a rapid change in direction. In essence, differential steering provides a robust solution for complex maneuvering challenges, enhancing the vehicle's agility and responsiveness. This underscores its potential as a key component in the design of efficient and adaptable vehicular control systems.

Figure 20:
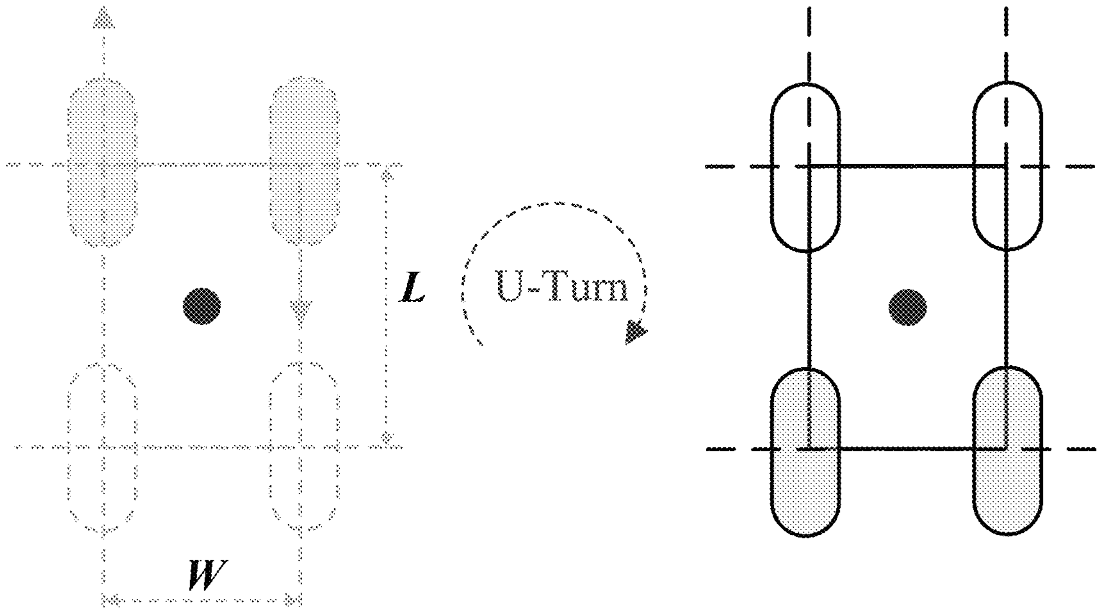
FIG. 20 shows a U-turn for a vehicle with the help of differential steering.

In a similar action, as shown in FIG. 20, the application of differential steering in a U-turn scenario, as depicted in the figure below, can markedly augment the vehicle's maneuverability. This is achieved by manipulating the motion of the wheels in a specific manner. For instance, the right wheel can be halted or even driven in reverse, while the left wheel continues its forward motion. This differential in wheel speeds allows the vehicle to execute a U-turn within its own length, effectively realizing a turning radius of zero. This capability of executing a U-turn with such precision and minimal space requirement underscores the superior maneuverability afforded by differential steering. It demonstrates the system's adaptability to complex driving scenarios and its potential to enhance the efficiency and safety of vehicular navigation. This is particularly beneficial in congested urban environments or in situations that necessitate swift changes in direction. In summary, differential steering, with its ability to modulate wheel speeds independently, provides a robust solution for enhancing vehicle maneuverability, particularly in challenging driving scenarios such as U-turns. The vehicle can turn any angle using the halt on the right front wheel and it is then acted as a center of rotation.

Thus, as described above, an autonomous driving system having a three-layer framework to optimize energy consumption in autonomous driving by utilizing the driving trajectory of human drivers is provided. The first layer involves smoothing out the driving path to reduce its curvature, thereby avoiding sudden changes in acceleration and velocity caused by abrupt path changes. The second layer is a trajectory optimization stage, where a relationship between speed and time in the human driving trajectory is assigned to the smoothed path. The acceleration is determined at each moment based on a motor torque-rotational speed efficiency diagram and a corresponding output efficiency of the motor. The best efficiency interval is then determined based on the reference motor efficiency, which is then converted into the optimal speed and acceleration interval of each of the wheels.

As described above, aspects of the present invention relate to an autonomous driving system having a three-layer framework to optimize energy consumption in autonomous driving by utilizing the driving trajectory of human drivers. The first layer involves smoothing out the driving path to reduce its curvature, thereby avoiding sudden changes in acceleration and velocity caused by abrupt path changes. The second layer is a trajectory optimization stage, where a relationship between speed and time in the human driving trajectory is assigned to the smoothed path. The acceleration is calculated at each moment based on the motor torque-rotational speed efficiency diagram and the corresponding output efficiency of the motor. A best efficiency interval is then determined based on a reference motor efficiency, which is then converted into an optimal speed and acceleration interval of each of the wheels. On the smooth path, the optimal speed and acceleration interval are jointly optimized to obtain the best driving trajectory in order to ensure that the motor operates in the high-efficiency interval. In the third layer, the generated optimal trajectory is combined with the model predictive control (MPC) method to generate the optimal steering angle to achieve accurate trajectory tracking.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An autonomous driving system for a vehicle having wheels, comprising: an electric vehicle body with a wire-controlled skateboard chassis;

an energy-saving control unit comprising:

a data acquisition and processing module to collect driving data of a human and environment information;

a constraints generation module which determines a suggested speed and acceleration region based on the driving data of the human and vehicle model constraints;

a joint optimization module transforms path information of the human into an optimization problem;

an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel, wherein the path tracking module determines a turning radius for the vehicle, and the differential steering controller uses the turning radius to adjust speeds of the wheels, wherein the constraints generation module is further configured to generate the suggested speed and acceleration region based on a motor energy efficiency map by converting reference speed and acceleration derived from the human driving trajectory into motor torque and motor speed, identifying an optimal efficiency region in the motor energy efficiency map, and converting the optimal efficiency region into an acceleration boundary, wherein the joint optimization module is configured to jointly optimize the path information of the human under the acceleration boundary such that the generated optimal trajectory is constrained to maintain motor operation within the optimal efficiency region, and wherein the optimal trajectory is generated by jointly considering (i curvature of the human driving trajectory and (ii) the acceleration boundary derived from the motor energy efficiency map.

2. The autonomous driving system according to claim 1, to be usable with a remote controller, wherein the vehicle has a steering wheel, pedals, a sensor array and an onboard computer, wherein:

the wire-controlled skateboard chassis has first through fourth in-wheel motors to respectively drive the wheels and are independently controlled;

the path tracking module comprises first through third modes:

human mode, autonomous mode, and remote mode;

wherein the human mode uses the steering wheel and pedals to control the vehicle, the autonomous mode uses the sensor array and the onboard computer to generate driving commands based on a real-time environment, and the remote mode uses wireless communication to transfer signals between the vehicle and the remote controller.

3. The autonomous driving system according to claim 2, further comprising a processor which controls a rotational speed and torque of each wheel depending on a path tracking algorithm of energy saving and an intended route, to independently adjust wheel speeds of the wheels.

4. The autonomous driving vehicle according to claim 2, wherein the differential steering mechanism modulates power supplied to the motors on each wheel according to principles of forward kinematics, which govern a relationship between the position of the vehicle and controllability associated with voltages of the motors.

5. An autonomous driving system for a vehicle having wheels, comprising: an electric vehicle body with a wire-controlled skateboard chassis;

an energy-saving control unit comprising:

a data acquisition and processing module to collect driving data of a human and environment information;

a constraints generation module which determines a suggested speed and acceleration region based on the driving data of the human and vehicle model constraints;

a joint optimization module transforms path information of the human into an optimization problem;

an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel, wherein the path tracking module determines a turning radius for the vehicle, and the differential steering controller uses the turning radius to adjust speeds of the wheels, wherein the speed and acceleration region is optimized by analyzing a motor efficiency map to maintain operation of the motor within a high-efficiency interval during autonomous driving, wherein the data acquisition and processing module comprises:

a sensor array installed on the vehicle to collect driving data of a human, and the driving data includes the position, speed, time, pedal depth, and brake information of the vehicle, as well as the surrounding environment and traffic conditions, the driving data being saved in a binary file format in a storage medium for efficient storage and transmission, wherein a local planning module processes the collected human driver data to generate a planned travel route, and extract the trajectory of the vehicle based on position and time data of the human driving trajectory, representing the travel route followed by the human driver;

the trajectory data is filtered to remove any outliers or noise that may affect the quality and accuracy of the travel route; boundary regions are generated based on road width, lane markings, and obstacles detected from an environment and traffic data, wherein the boundary regions define feasible and infeasible regions for the vehicle to travel; reference points are selected from the trajectory data, and vertical vectors are generated from the reference points to the boundary regions, the vertical vectors representing a lateral deviation of the vehicle from the reference points;

optimization variables are selected based on objective and constraints of the path planning, the optimization variables include at least one of curvature, heading angle, lateral offset, longitudinal speed, and acceleration of the vehicle;

a cost function is established based on the optimization variables and the human driver data, wherein the cost function reflects preferences of the human driver and comfort level, as well as the safety and efficiency of the vehicle;

the cost function and the constraints are converted into a quadratic programming form, the quadratic programming form consists of a quadratic objective function and linear equality and inequality constraints; the constraints are generated based on the boundary regions, vehicle dynamics, and traffic rules;

numerical optimization is performed using the joint optimization module that finds optimal values of optimization variables that minimize the cost function while satisfying the constraint conditions; and obtaining the optimal path with the lowest overall curvature by maintaining the reference path's smoothness and the tracking accuracy.

6. An autonomous driving system for a vehicle having wheels, comprising: an electric vehicle body with a wire-controlled skateboard chassis;

an energy-saving control unit comprising:

a data acquisition and processing module to collect driving data of a human and environment information;

a constraints generation module which determines a suggested speed and acceleration region based on the driving data of the human and vehicle model constraints;

a joint optimization module transforms path information of the human into an optimization problem;

an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel, wherein the path tracking module determines a turning radius for the vehicle, and the differential steering controller uses the turning radius to adjust speeds of the wheels, wherein the speed and acceleration region is optimized by analyzing a motor efficiency map to maintain operation of the motor within a high-efficiency interval during autonomous driving, wherein:

the constraints generation module determines a suggested speed and acceleration region based on speed and acceleration information of the human driver;

the process of finding and selecting the optimal motor output efficiency point for a given trajectory comprises efficiency point identification and efficiency area selection;

wherein in the efficiency point identification, a motor output efficiency point of a current path is found in a suggested area where a motor output efficiency map that corresponds to a desired speed and torque range of the vehicle, the motor output efficiency point on the map has a highest efficiency value for the current trajectory;

the efficiency point identification maximizes the energy efficiency and performance of the vehicle; and efficiency area selection is based on the current output efficiency point and a suggested interval, the area with output efficiency greater than the current efficiency is selected; the suggested interval is a threshold value that defines an acceptable range of efficiency deviation from the current efficiency point an area with output efficiency greater than the current efficiency is a region of a motor output efficiency map that has efficiency values higher than the current efficiency point minus the suggested interval.

7. An autonomous driving system for a vehicle having wheels, comprising: an electric vehicle body with a wire-controlled skateboard chassis;

an energy-saving control unit comprising:

a data acquisition and processing module to collect driving data of a human and environment information;

a constraints generation module which determines a suggested speed and acceleration region based on the driving data of the human and vehicle model constraints;

a joint optimization module transforms path information of the human into an optimization problem;

an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel, wherein the path tracking module determines a turning radius for the vehicle, and the differential steering controller uses the turning radius to adjust speeds of the wheels, wherein the speed and acceleration region is optimized by analyzing a motor efficiency map to maintain operation of the motor within a high-efficiency interval during autonomous driving, further comprising:

the joint optimization module transforms the path of the human driver into an optimization problem by establishing a cost function that considers the distance between adjacent discrete positions generated by a human driver and a reference position, distance from an endpoint to the reference position, wherein the weights of the distance between the discrete points generated by the human driver and the reference position, distance from the endpoint to the reference position, speed, acceleration, endpoint velocity, reference speed, and endpoint acceleration are adjusted according to driving behavior of the human driver to adapt to different behavioral needs;

constraints including the position of each optimization point, velocity, acceleration, continuous position of the optimization point, continuous velocity, initial point state, and end state are added into a cost function for optimization to minimize cost;

the cost function and constraints are then transformed into a quadratic programming form and brought into the joint optimization module for real-time solutions;

the optimal trajectory containing time information with a lowest overall curvature is obtained from path smoothing optimization, representing a best trade-off between the driver's preferences and the vehicle's performance.

8. An autonomous driving system for a vehicle having wheels, comprising: an electric vehicle body with a wire-controlled skateboard chassis;

an energy-saving control unit comprising:

a data acquisition and processing module to collect driving data of a human and environment information;

a constraints generation module which determines a suggested speed and acceleration region based on the driving data of the human and vehicle model constraints;

a joint optimization module transforms path information of the human into an optimization problem;

an accurate tracking algorithm to combine a state of the vehicle and a generated optimal trajectory based upon the path information of the human;

a path tracking module to find an optimal point in driving movement of the human, to track an optimized path; and a differential steering controller independently controls the speed of each wheel;

wherein the path tracking module determines a turning radius for the vehicle, and the differential steering controller uses the turning radius to adjust speeds of the wheels, the system further comprising:

a two-layer MPC controller to combine a state of the vehicle and the generated optimal trajectory based on the path information of the human driver, the two-layer MPC controller comprising;

an inner MPC; and an outer MPC which predicts a state in the control process and generates the optimal tracking speed and tracking state in combination with the optimal trajectory information based on vehicle dynamics constraints and trajectory information; and a fuzzy controller which determines a prediction time and control period of the inner MPC based on the speed and tracking state generated by the outer MPC, to ensure tracking accuracy and save a calculation amount;

wherein the inner MPC is based on dynamic constraints, combined with the optimal speed generated by the outer MPC and a prediction time and control cycle of the fuzzy controller;

establishing a cost function using a vehicle dynamics model; and adding the vehicle hardware constraints to obtain an optimal front wheel angle.

9. The autonomous driving system according to claim 8, wherein:

finding the optimal point in driving movement of the human driver is obtained at a current moment, wherein:

a map displays the energy efficiency of different points in the driving movement;

a range of high energy efficiency points for numerical modeling are selected; and an optimization technique is used to find the optimal point in the range; and based on the optimal speed and the front wheel angle, the output of the two-layer MPC controller is the optimal control point, to be converted into a vehicle control quantity for real-time control.

10. The autonomous driving system, according to claim 9, wherein:

the finding of the optimal point in the driving movement is obtained at a current moment, and the human driving movement represents acquisition of data pertaining to position, velocity, and acceleration by the human driver as facilitated by vehicular sensors and serves as a representation of human motion within a context of vehicle operation; and in accordance with the optimal point, corresponding motor output parameters of speed and torque, are determined;

subsequently transforming the motor torque and speed corresponding to the optimal point into the vehicle speed and acceleration;

regulating the vehicle based on acceleration data to control the vehicle;

wherein the optimal point serves as an intermediary variable that necessitates conversion into a final acceleration value, to be executed by the vehicle.

* * * * *